March 19, 1968 D. K. PORTER ET AL 3,374,138
TIRE BUILDING MACHINE

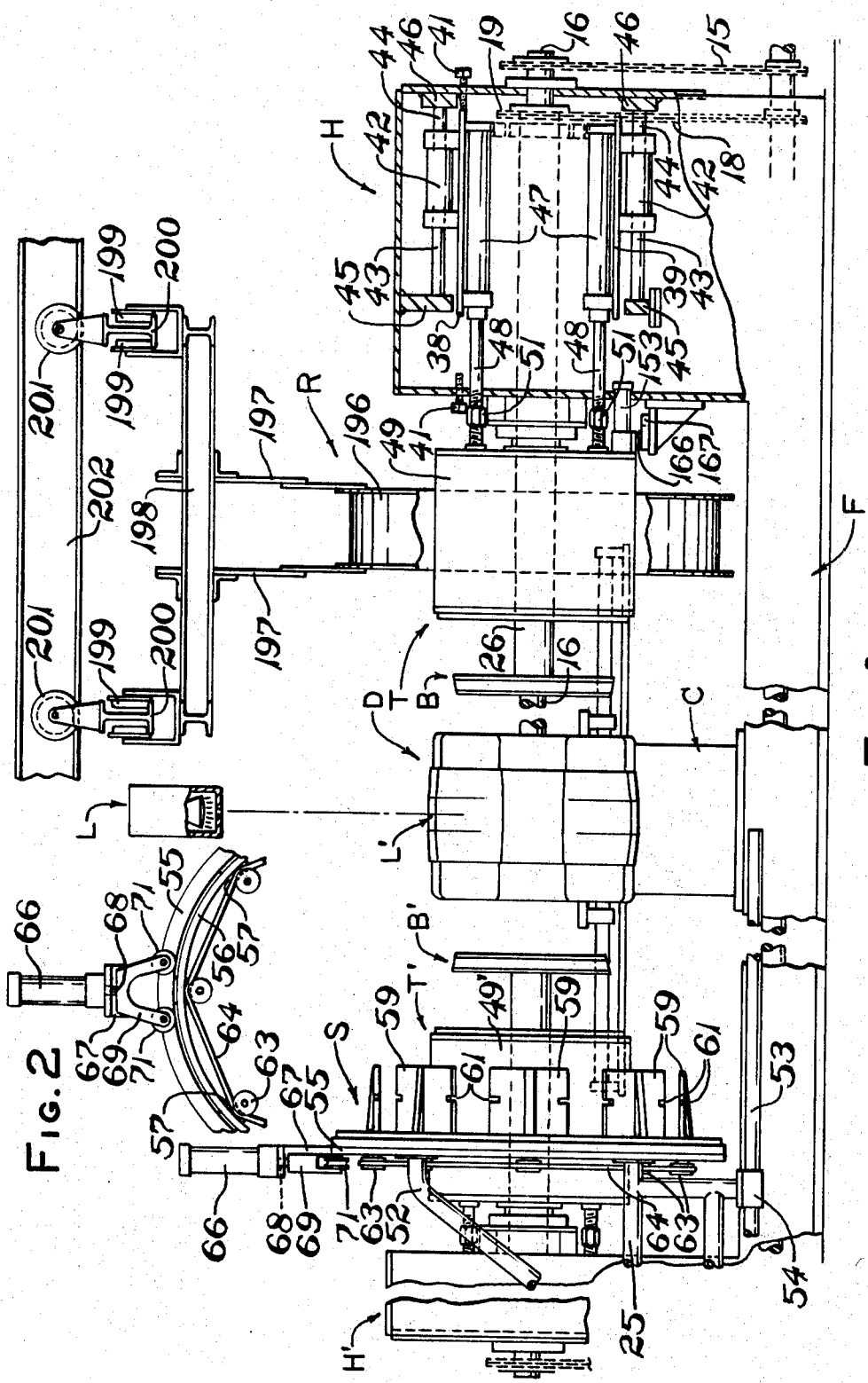

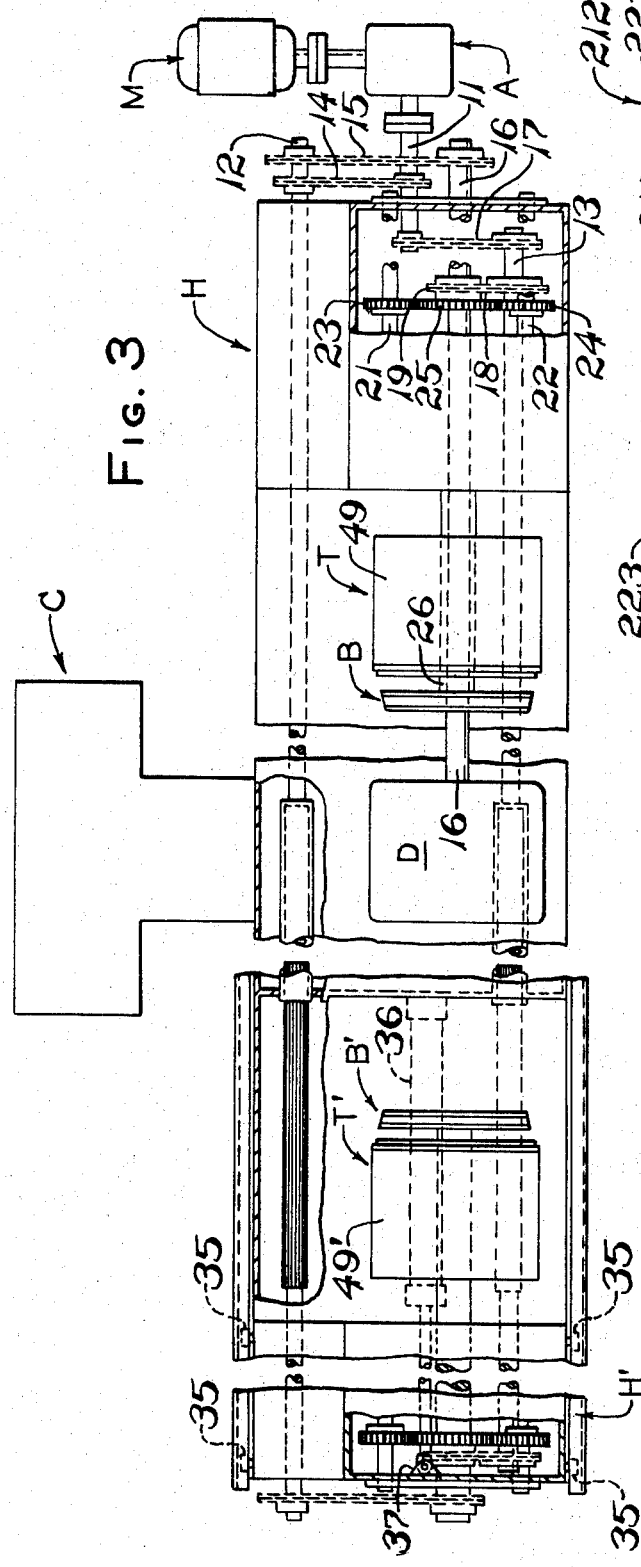
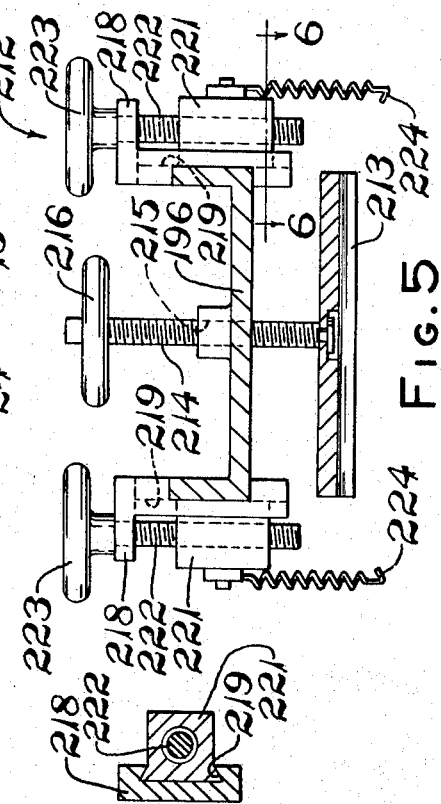
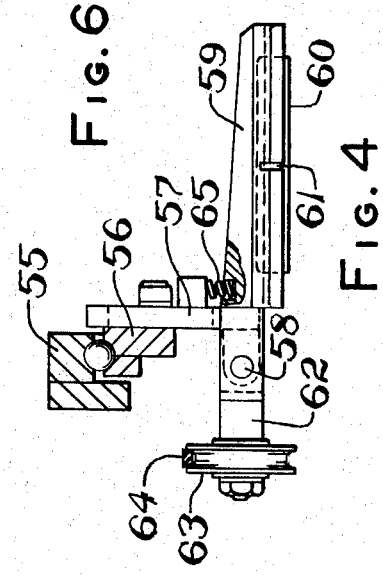

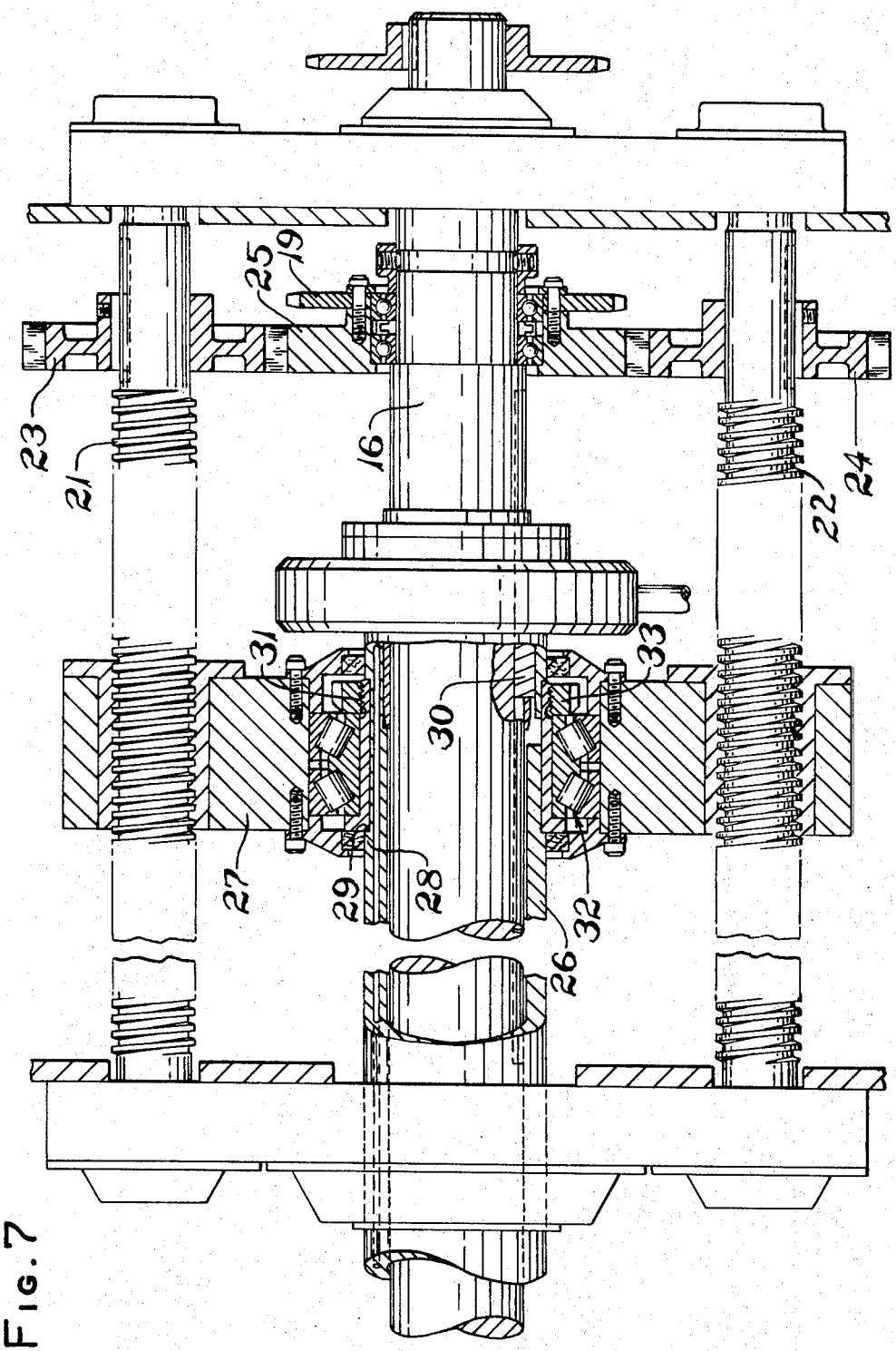

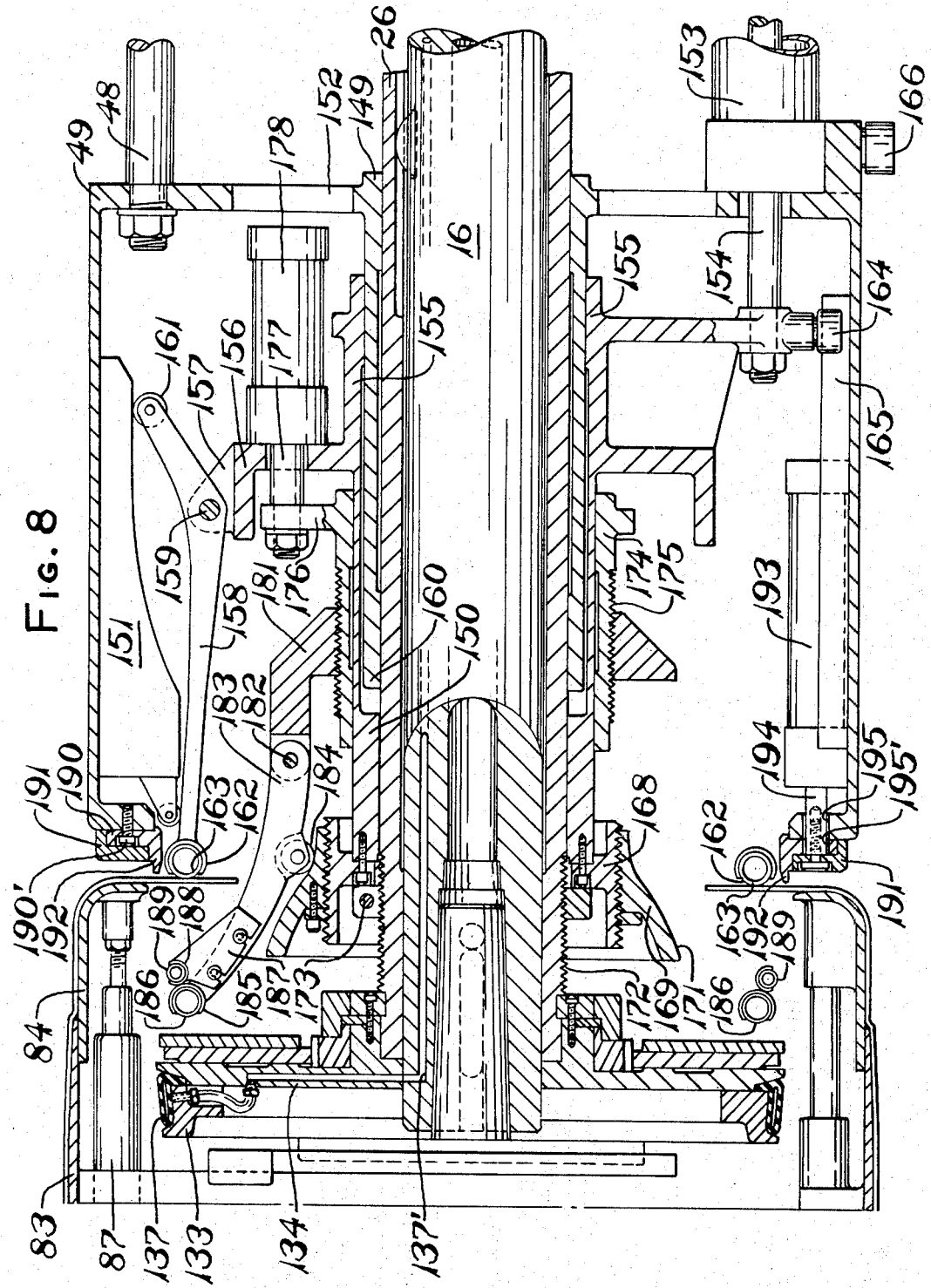

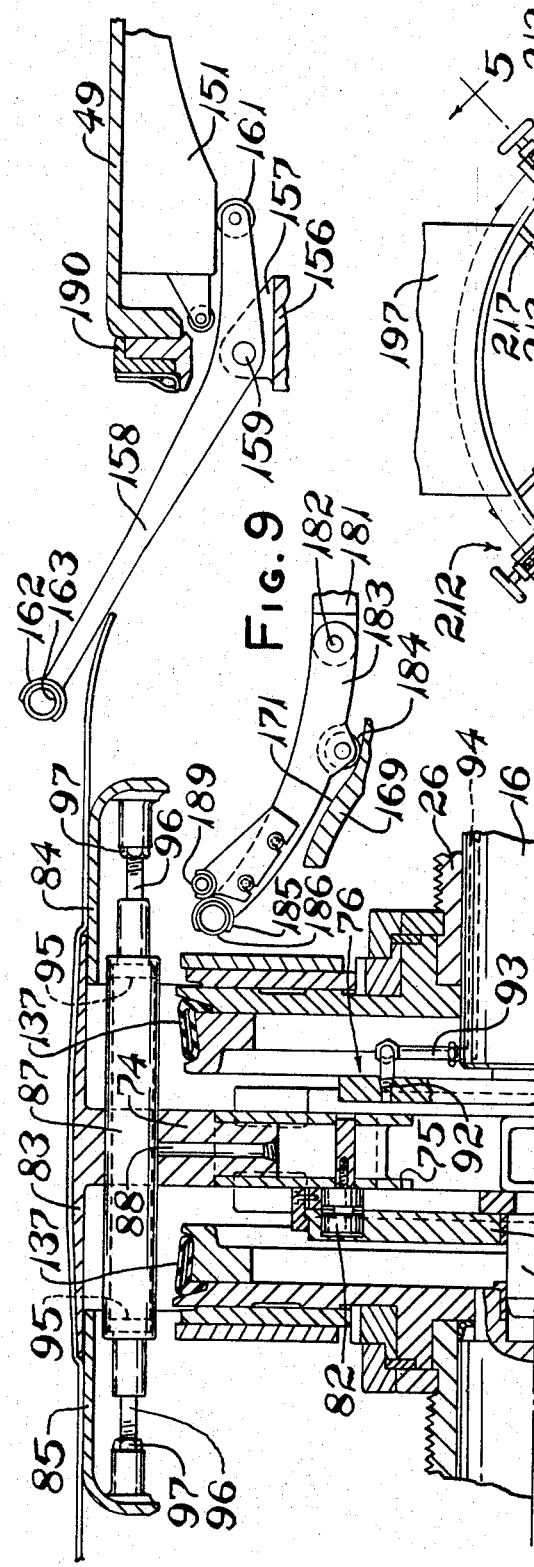
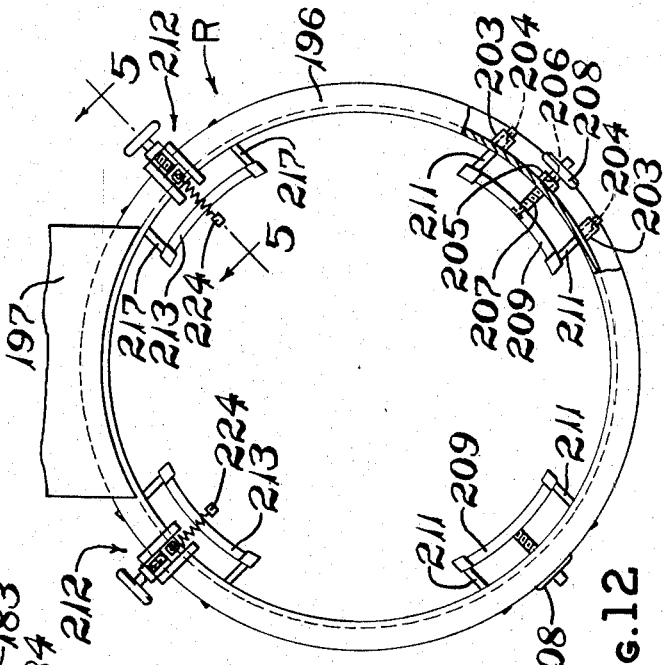
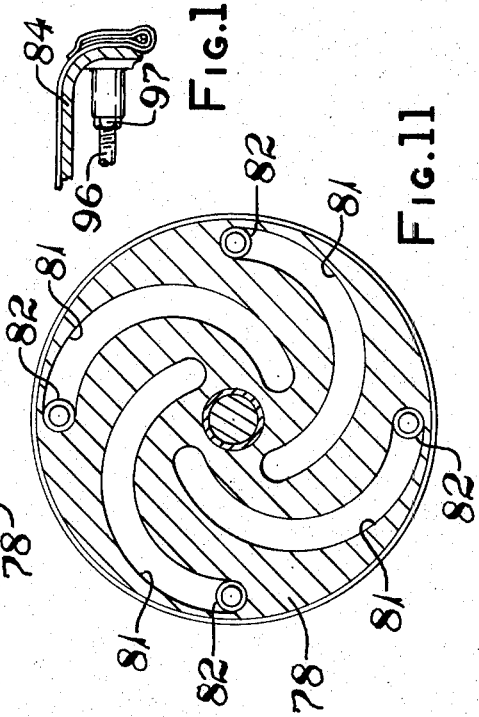
Fig. 9
Fig. 10
Fig. 11
Fig. 12

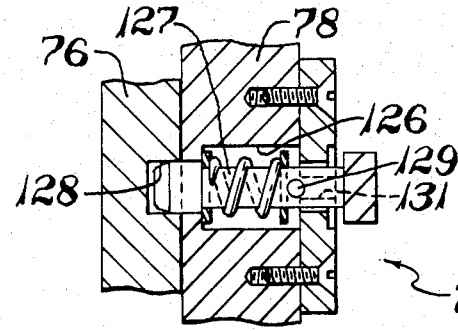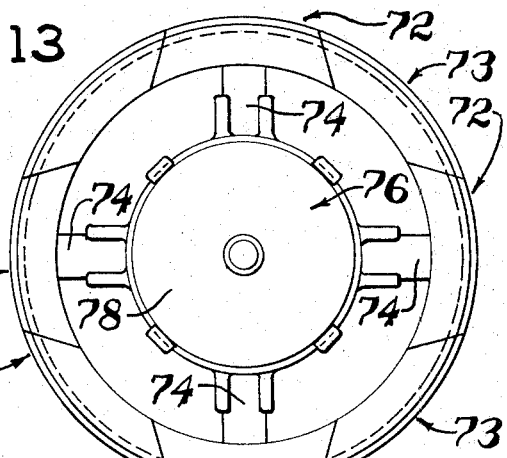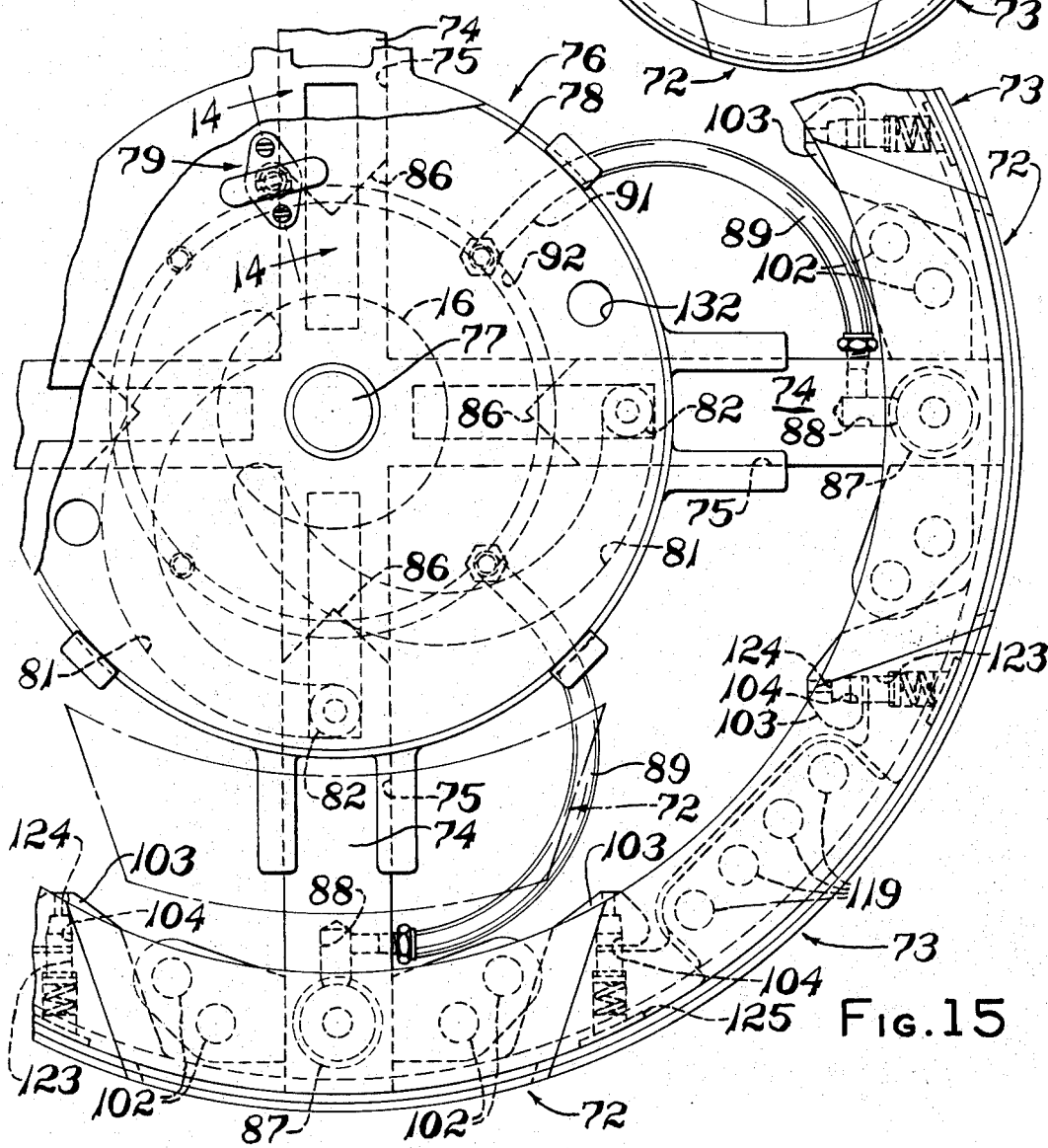

Filed May 19, 1964 12 Sheets-Sheet 9

March 19, 1968  D. K. PORTER ET AL  3,374,138
TIRE BUILDING MACHINE
Filed May 19, 1964  12 Sheets-Sheet 10
Fig. 22
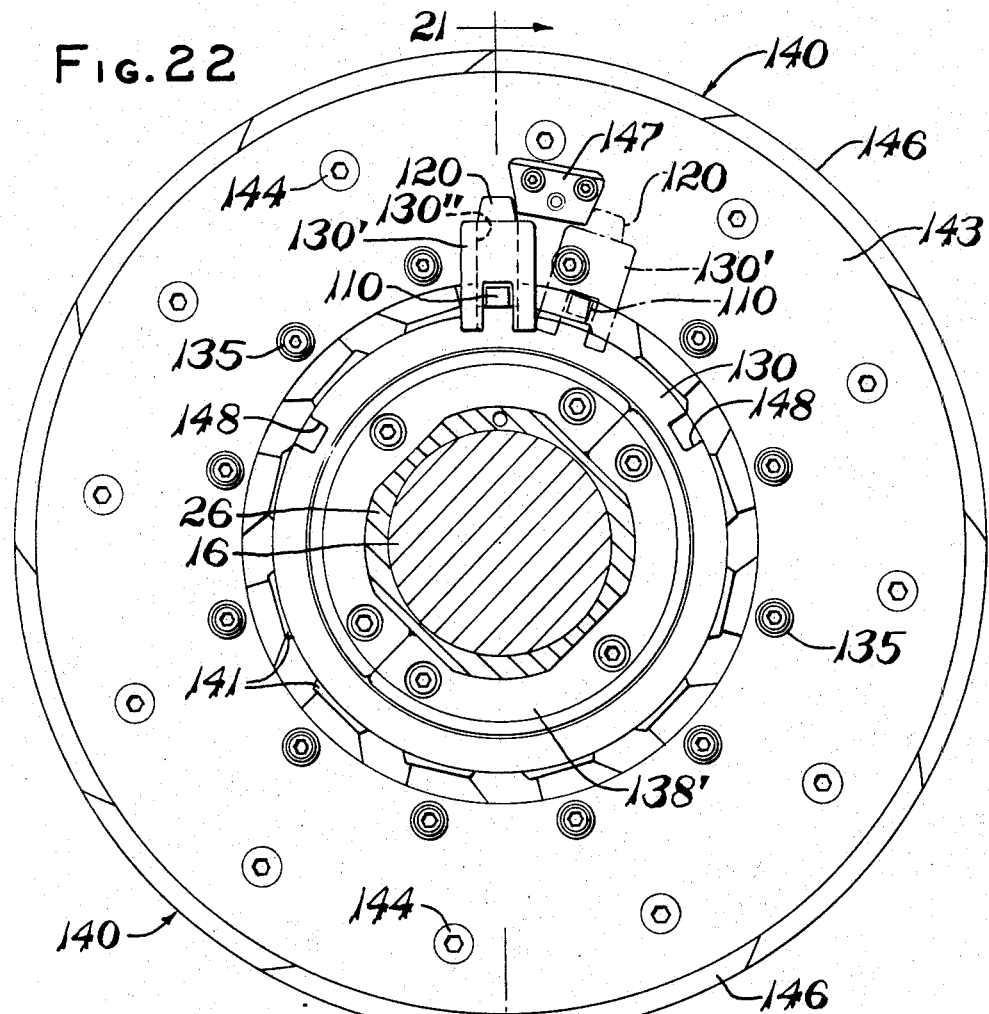
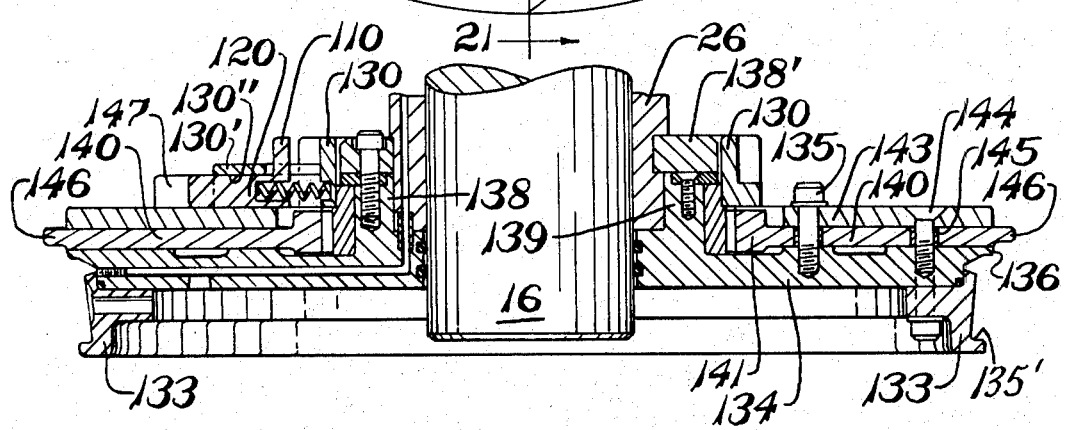
Fig. 21

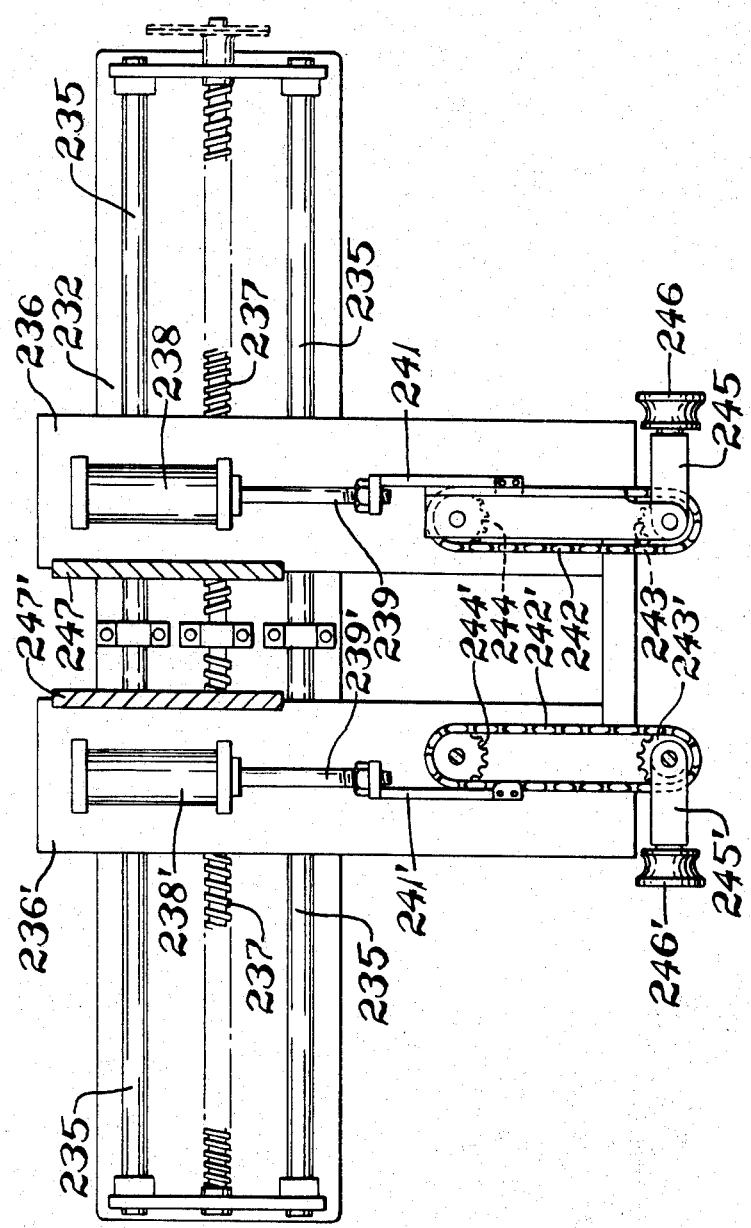

# United States Patent Office 3,374,138
Patented Mar. 19, 1968

3,374,138
TIRE BUILDING MACHINE
Donald K. Porter, Cuyahoga Falls, Ohio, James W. Eckenwiler, Phoenix, Ariz., and Fred K. Barns, Ralph F. Cooper, and Walter E. Head, Akron, Ohio, assignors to The B. F. Goodrich Company, New York, N.Y., a corporation of New York
Filed May 19, 1964, Ser. No. 368,511
27 Claims. (Cl. 156—400)

ABSTRACT OF THE DISCLOSURE

A tire building apparatus comprising a tire building drum that is axially and radially expandible, with a pair of spaced bead supports having an inflatable ring and expansible flange which cooperate with a tire carcass on the drum to define a closed chamber, turn-up and turn-down means with a bead setter cooperative therewith, stitching mechanism and a centering means which provides a line image on the building drum to facilitate the building of a complete tire carcass on such drum.

---

This invention relates to pneumatic tires for vehicles and the like and more particularly to a new and improved apparatus for constructing pneumatic tire casings.

In the manufacture of pneumatic tires upon a flat band building drum, the carcass is built substantially cylindrical in form by plies of reinforced elastomeric sheets in cooperation with beads. While still supported on the building drum and sidewall and necessary trim are applied. The tire carcass is removed from the drum and transferred to a second drum for additional operations thereto such as for the application of the overhead band and thread. Such second drum may shape the tire carcass or a variation in procedure thereof transfers the tire carcass in pulley form to a shaper wherein mechanical or fluid pressure is used to force the tire carcass out to toroidal or tire shape subsequent to the vulcanization thereof. A further variation in such flat band building form uses the multiple station wherein the tire building drum and carcass are transported from station to station for sequential operation thereon. Such procedures have also been employed to manufacture radial form tires but with considerable difficulty. The radial tire includes an inextensible structure band as a breaker or undertread ply having parallel cords of minimum elongation arranged to be in radial planes which planes intersect each other on the axis of rotation of the tire and contain the rotational axis of the tire. Initially, the tire band containing the plies of cords is such that the cords are parallel to each other.

Mechanization of the process for building tires with radial cord have generally employed inflatable bags and have been confined to smaller dimensional tires. The present invention provides a novel apparatus for building a radial cord tire, which includes the shaping thereof, of relatively large size by a flat band method at a single station to thereby manufacture such a tire more economically, yet with greater control as to accuracy than previously obtained. In addition, means are provided to maintain symmetry in the tire construction eliminating any asymmetry which causes unbalance and abnormal stress.

Accordingly, it is an object of this invention to provide a new and improved apparatus for building a pneumatic tire carcass.

A further object of this invention is to provide a new and improved tire building apparatus for forming and shaping a tire carcass into an annulus.

A further object of this invention is to provide a new and improved tire building machine for manufacturing tires having a substantially inextensible stricture band for preventing radial expansion of the tire tread.

Still another object of this invention is to provide a new and improved tire building machine which more accurately fabricates a tire carcass.

A further object of this invention is to provide novel means for maintaining symmetry in the building of a tire.

Another object of this invention is to provide a novel tire building apparatus which builds a symmetrical preformed radial tire in a single drum at a one station operation.

Still a further object of this invention is to provide novel means for centering and positioning an overhead band onto a semi-inflated tire carcass.

Another object of this invention is to provide an improved apparatus for stitching plies of rubberized material over a bead of a tire carcass on each end of a tire building drum simultaneously about the entire circumference of the tire wherein such stitching includes turning the plies down as well as up.

A further object of the invention is to provide an improved apparatus as defined in the preceding paragraph wherein means are provided that cooperate during such stitching to support the drum on which such tire carcass is stitched and thereafter being cooperative with the tire drum to define a pressure chamber.

The invention further resides in certain novel features of the construction and in the combination and arrangement of the apparatus parts, and further objects and advantages of the invention will be apparent from the following description of the presently preferred embodiment described with reference to the accompanying drawings, forming a part of this application in which:

FIG. 1 is a side elevational view with parts broken away and parts omitted, showing a tire building machine constructed according to the present invention.

FIG. 2 is a fragmentary end view of the upper portion of the band support shell S.

FIG. 3 is a top view with parts broken away and parts omitted of the tire building machine.

FIG. 4 is an enlarged view of a portion of the band support shell S showing the band removal means.

FIG. 5 is an enlarged view of the tire support means taken along line 5—5 of the tire removal means shown in FIG. 12.

FIG. 6 is a cross sectional view of the tire support means shown in FIG. 5 taken along line 6—6.

FIG. 7 is an enlarged plan view of the cross-head in the headstock H of FIGS. 1 and 3.

FIG. 8 is a side elevational cross sectional view of the turn-down turn-up means T on an enlarged scale.

FIG. 9 is a fragmentary cross-sectional view of a portion of a drum showing a portion of the turn-up and turn-down means.

FIG. 10 is a fragmentary portion of the drum showing plies of fabric and bead associated therewith.

FIG. 11 is a cross sectional view of a scroll plate associated with the drum.

FIG. 12 is an end elevational view of the tire removal means.

FIG. 13 is an end view of a tire drum illustrating the fixed and removable segments.

FIG. 14 is an enlarged cross sectional view of latch means taken along line 14—14 of FIG. 15.

FIG. 15 is a fragmentary end view on an enlarged scale of the tire building drum showing the locking means for the fixed and removable segments and the scroll plate.

FIG. 21 is a cross sectional view of the bead ring flange taken along line 21—21 of FIG. 22.

FIG. 22 is an end view of the bead ring flange.

FIG. 25 is a plan view of the stitching mechanism with a portion removed for clarity.

Figure 16:
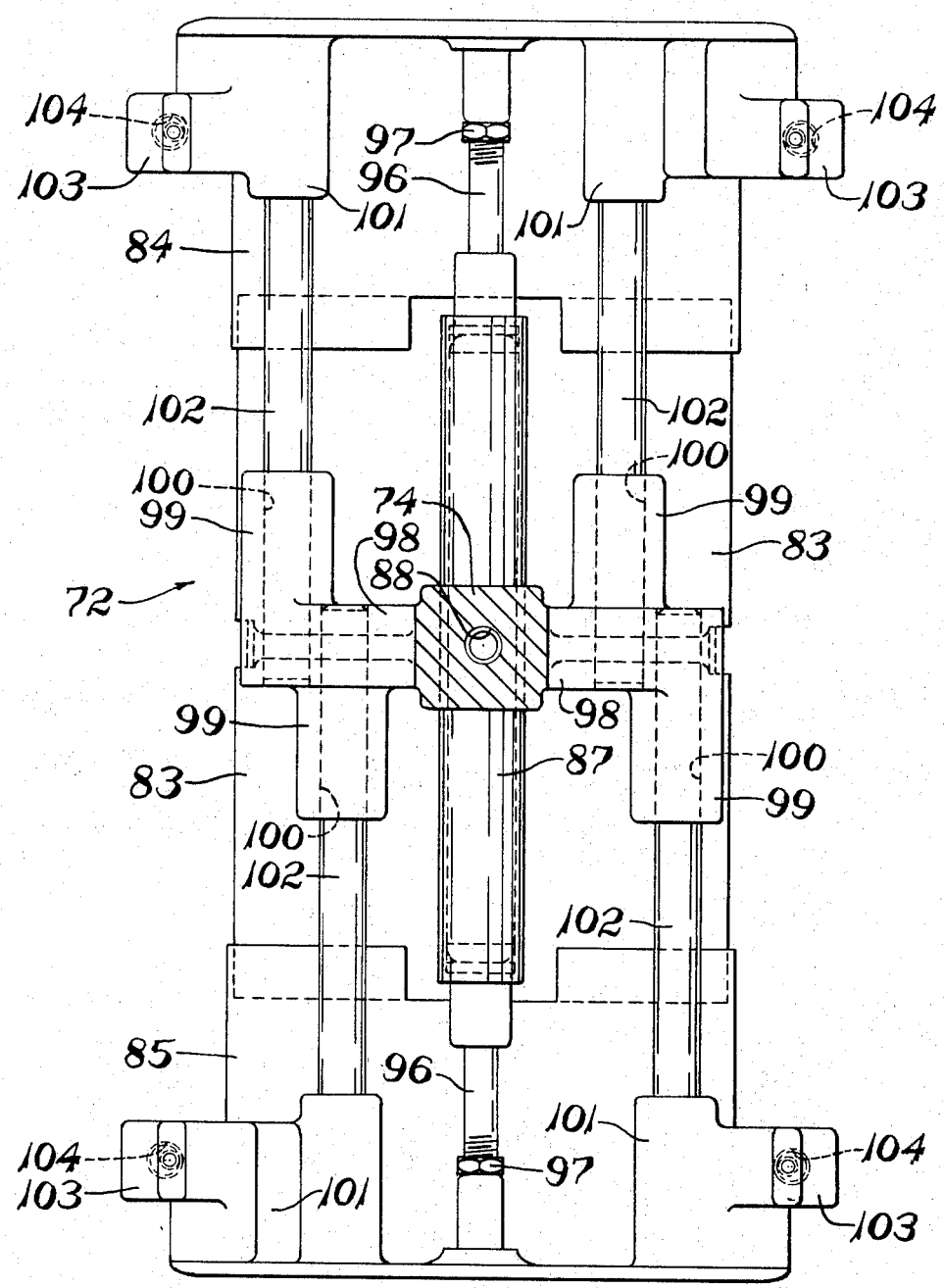
FIG. 16 is a plan view of the fixed segment taken from the underside of the drum.

Referring more particularly to the drawings in which like parts are referred to by the same numerals throughout the several views, FIG. 1 discloses a tire building machine. The machine has a rigid metal base frame F, a headstock H secured to one end thereof, a tire removal mechanism R, a tire building drum D, band support shell S, and a movable headstock H'. The headstocks H and H' each support bead ring flanges B, B' and turn-down turn-up means T, T', respectively. Turn-down means T includes a bead setter to be described. Disposed rearwardly of the drum D is the stitching mechanism C shown in FIGS. 1, 3, 24 and 25. A light source L projects an illuminated line L' on the surface of drum D to provide centering means.

Headstock H houses a shaft 11 (FIG. 3) suitably journalled therein, which shaft 11 is driven by a motor M through a transmission A. As shown in FIG. 3, headstock H houses a pair of spaced longitudinally extending shafts 12 and 13. Shaft 12 is driven by a chain drive 14 from shaft 11 which in turn drives via chain drive 15 a drum shaft 16 which rotates drum D. Shaft 11 via chain drive 17 drives shaft 13. Shaft 13 in turn drives via a chain drive 18 (FIGS. 1 and 3) a sprocket 19 that is rotatably mounted on shaft 16. Thus shaft 16 and the sprocket 19 are driven relatively to each other at different speeds through the chain drives described. Obviously suitable clutches are employed to effect selective rotation; however, for simplicity, reference to clutches will be omitted.

Headstock H (FIG. 3) supports for rotation a pair of spaced feed shafts 21 and 22. Feed shafts 21 and 22 are rotated in the same directions by their respective keyed connection to gears 23 and 24, which gears 23 and 24 are driven by gear 25 suitably connected to the sprocket 19 (FIG. 7). Journalled for rectilinear movement on shaft 16 is a quill or tubular sleeve 26, which sleeve 26 has a crosshead 27 connected thereto for movement therewith. Sleeve 26 is recessed as at 28 to provide a shoulder 29 and threaded as at 31. Ball bearing unit 32 which abuttingly engages shoulder 29 cooperates with an annular retainer nut 33 threaded onto portion 31 of sleeve 26 which permits rotation of the sleeve 26 relative to crosshead 27. Sleeve 26 is keyed as at 30 to shafts 16 to permit rectilinear motion therebetween. The respective outer end portions of crosshead 27 are threadedly engaged by the respective feed shafts 21 and 22 which shafts being of same hand move crosshead 27 and sleeve 26 in a rectilinear direction, which rectilinear direction is dependent on the direction of rotation of drive gear 25. As shown in FIGS. 3 and 1, shaft 16 is connected to drum D whereas sleeve 26 is connected to the bead ring flange B.

Headstock H' is similar in all respects to headstock H except that headstock H' is movable. Therefore, like parts are designated by similar numbers but primed. Headstock H' is guided in its linear movement on frame F by suitable roller 35 (FIG. 3) engaging rails or ways on frame F. The means for moving headstock H' is a hydraulic cylinder 36 mounted on the frame F having its rod end pivotally connected as at 37 to the headstock H'. Pressurization of the rod end of cylinder 36 moves headstock H' rightwardly as viewed in FIG. 3.

Headstock H additionally houses a pair of spaced support brackets 38 and 39 (FIG. 1) which brackets are guided for reciprocable longitudinal movement therein. The limits of movement are determined by suitable adjustable screws 41 mounted in the end walls of headstock H which acts as stop members. Bracket 38 has a double-acting hydraulic cylinder 42 rigidly secured thereto. Cylinder 42 has piston rods 43 and 44 extending from the opposite ends thereof, which rods 43 and 44 are adapted to abuttingly engage stops 45 and 46, which stops are rigidly secured to the frame of the headstock H. Pressurization of the one end or the other end of hydraulic cylinder 42 moves plate 38 forwardly toward the drum D, or rearwardly away from drum D as viewed in FIG. 1 a predetermined amount in accordance with which end of hydraulic cylinder 42 is pressurized. The lower surface portion of plate 38 rigidly supports a hydraulic cylinder 47 for movement therewith. Hydraulic cylinder 47 has a piston whose rod 48 is rigidly secured to one end of a cylindrical cage 49 of turn-down turn-up means T. Rod 48 is adjustable as at 51 to permit the proper spacing of cage 49 relative to drum D. Bracket 39 similarly supports a pair of hydraulic cylinders identical in design and purpose as cylinders 42 and 47 except that the cylinders are inverted; accordingly, like parts are designated by like numerals. Headstock H' carries brackets similar to brackets 38 and 39 as well as similarly associated parts which are connected to cage 49' of turn-down turn-up means T'. The crosshead in H' and rotation of the turn-down and turn-up elements are driven by splined connection to shafts 12 and 13 (FIG. 3) in the same manner as similar elements in headstock H.

Band support shell S comprises a support frame 52, suitably mounted for longitudinal movement on spaced guide rails 53 via annular bosses 54 (FIG. 1). Support frame 52 has an annular mounting support 55 suitably rigidly connected thereto for movement therewith. Mounting support 55 supports for relative rotation therein an annular ring 56 (FIG. 4) which ring 56 supports a plurality of circumferentially spaced brackets 57. Each bracket 57 pivotally supports as at 58 the intermediate portion of an elongated band support segment 59. Each segment 59 has magnetic strips 60 suitably cemented to the cavities on the underside thereof for contacting a fabric strip of tire band material having strands of wire therein. Each segment 59 has spaced aligned recesses 61 such that a plane passing through the recesses 61 is normal to the axis of rotation or the longitudinal center line of the drum D. The rearward portion 62 (FIG. 4) of each segment 59 supports a pulley 63. A circumferentially extending V-belt 64 abuttingly contacts the respective pulleys 63 to maintain such pulleys 63 and their associated segments 59 in circumferentially spaced alignment. A spring 65 having one end portion seated in bracket 57 has its other end portion seated in a groove in segment 59 to thereby bias segment 59 downwardly whereby the respective pulleys 63 are held in contact with the V-belt 64. A hydraulic or air cylinder 66 (FIGS. 1 and 2) is suitably mounted on a bracket 67, which bracket 67 is connected to the upper end portion of support 55. The piston rod 68 of cylinder 66 is connected to a yoke 69, whose end portions respectively support pulleys 71. Actuation of the head end of cylinder 66 moves the piston rod 68 and yoke 69 downwardly as viewed in FIGS. 1 and 2 whereby pulleys 71 engage spaced portions of V-belts 64 to move such portions inwardly thereby camming all pulleys 63 radially inwardly toward the axis of rotation of drum D, which action pivots the respective forward portions of segments 59 containing strips 60 radially outwardly about their pivot supports 58. Such movement operates to release a tire band as to be described.

The tire building drum D comprises a plurality of circumferentially spaced fixed drum segments 72 (FIGS. 13 and 15) which segments 72 cooperate with a plurality of circumferentially spaced removable drum segments 73 to define a continuous smooth cylindrical building surface. A tire band comprising a plurality of rubberized fabric plies are assembled to form a tire carcass on the drum surface. Each fixed segment 72 has a radially depending leg member 74 which is slidably guided in a recess 75 (FIG. 15) of the drum hub indicated generally as 76. The drum hub 76 is mounted on the shaft 16 driven by means previously described. Shaft 16 has a reduced end portion 77 (FIG. 9) which acts as a pilot. Journalled for rotation on end portion 77 is a scroll plate 78 (FIG. 9) suitably connected to the drum hub 76 as by latch means 79 (FIGS. 14 and 15) to be described. Scroll plate 78 has a plurality of cam grooves 81 which are crescent and extend generally from the outer edge of plate 78 toward the central portion thereof. Each leg member 74 has a cam follower 82 which is slidingly received by one of the cam grooves 81. Rotation of the scroll plate 78 relative to the hub 76 and the leg members 74 causes the respective follower members 82 to be cammed inwardly by the respective cam grooves 81 to thereby move the fixed segments 72 along with leg members 74 radially inwardly on drum hub 76 to a collapsed condition.

The fixed segments 72 are similar in all respects; accordingly only one fixed segment 72 will be described wherein like reference numerals designate like parts throughout.

Fixed segment 72 as clearly shown in FIGS. 9, 13, 16 has a central arcuate section 83 and a pair of complementary spaced movable end arcuate sections 84 and 85. The leg member 74 extends downwardly from the central inner wall surface of the central arcuate section 83. The lower end portion of the leg member 74 is tapered to provide an apex 86 such as to facilitate the mating of the respective sides of the apexes 86 of all the leg members 74 upon collapsing of the drum. Suitably mounted on leg member 74 adjacent the central section 83 of the fixed segment 72 is a double-acting cylinder 87 having its longitudinal axis parallel to the longitudinal center line of shaft 16. Fluid pressure is supplied to the central portion of cylinder 87 via a passageway 88 (FIGS. 9 and 15) which passageway 88 is connected to a suitable pressure source via a conduit 89, passageway 91, arcuate recess 92, conduit 93 and a passageway 94 that extend through shaft 16. Cylinder 87 has a pair of opposed piston heads 95 (FIG. 9) connected via respective threaded rods 96, and lock nuts 97 to the respective end sections 84 and 85. The respective end sections 84 and 85 are adjusted relative to the central section 83 upon loosening of lock nuts 97, rotating threaded rod 96 relative to the end section and thereafter tightening of lock nuts 97 against the end sections 84 and 85. Upon the release of pressure on the head end of the pistons 95, 95 of cylinder 87 through suitable control means and the connection of such cylinder ends to exhaust, the respective end sections 84 and 85 are adapted to be moved inwardly toward each other. Means may be provided to retract the respective end sections 84 and 85 by providing suitable control means to pressurize the rod ends of cylinder 87 while simultaneously releasing the pressure on the head end of cylinder 87. Central section 83 of segment 72 has a web portion 98 (FIG. 16) connecting the leg member 74 to spaced bosses 99. Each boss 99 has a bore 100 whose axis is parallel to the axis of cylinder 87. The respective end sections 84 and 85 have bosses 101, wherein each boss 101 supports a longitudinally extending guide rod 102 which is slidingly received by the bore 100 of boss 99 associated therewith. The guide rods 102 cooperate with the bores 100 to maintain the end sections 84 and 85 in alignment with the central section 83. The respective end sections 84 and 85 each have a pair of spaced flanged portions 103 (FIG. 15) wherein each flanged portion 103 has a stepped bore 104 that extends from the lower surface inwardly for a purpose to be set forth.

The removable segments 73 are similar in all respects. Accordingly, only one segment 73 will be described wherein like reference numerals designate like parts throughout.

Removable segment 73 has a central arcuate section 105 and a pair of complementary spaced movable end arcuate sections 106 and 107. Central arcuate section 105 has a web portion in its inner central wall section connecting spaced bosses 108, 109, 111 and 112. Bosses 108, 109, 111 and 112 have a bore extending longitudinally therethrough for a purpose to be set forth. Bosses 109 and 111 have raised portions 109' and 111' which raised portions have tapered side portions 113. The inner central edge portion of each end section 106 and 107 has one end of a link member 114 pivotally mounted thereon as via a pivot pin 115. The other end of link member 114 cooperates with the tapered side portion 113 of the associated raised portion of bosses 109 and 111 to serve as means for transmitting support from the bead ring flanges B and B' to the drum D. As shown in phantom lines in FIG. 18, the bead ring flanges B and B' are adapted to contact link member 114. Link member 114 is connected to the raised portions of bosses 109 and 111 via a magnetic attraction.

The end sections 106 and 107 of removable segment 73 each has bosses 116 and 117. Bosses 116 and 117 of end sections 106 and 107 support longitudinally extending guide rod 119 slidably received by the bore of bosses 108, 109, 111 and 112. The guide rod 119 cooperates with such bore in bosses 108, 109, 111, and 112 to maintain end sections 106 and 107 in alignment with the central section 105. The pivot pin 115 for the link members 114 are supported by the bosses 117.

Figure 17:
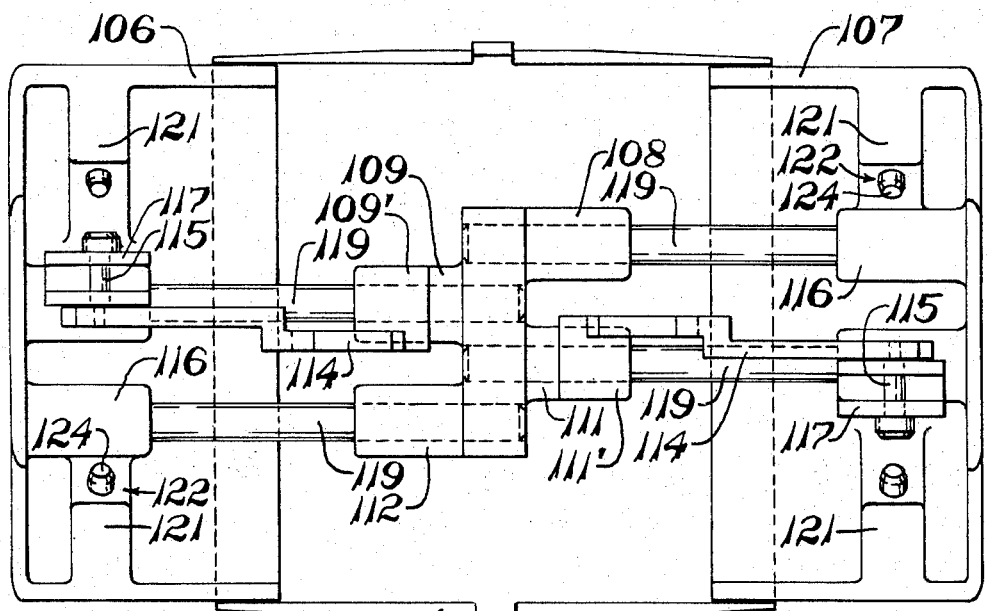
FIG. 17 is a plan view of a removable segment of the drum taken from the underside of the drum.
Figure 19:
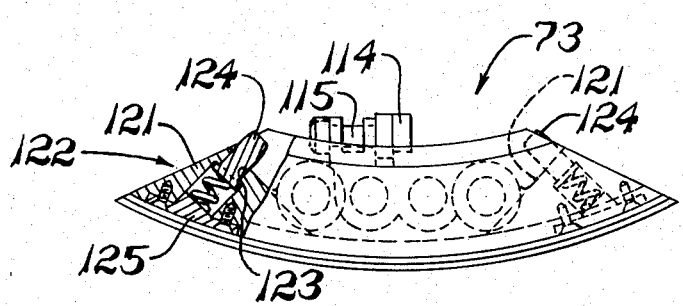
FIG. 19 is an end view of the removable segment with a portion broken away for clarity.

The respective corner portions of end sections 106 and 107 have raised inverted V-shaped projections 121 (FIGS. 17 and 19) which house latch means 122. The respective latch means 122 cooperate with associated bores 104 in the fixed segments 72 to maintain the segments 72 and 73 in a continuous smooth cylindrical building surface. Each V-shaped projection 121 has a bore 123 which houses a spring biased detent pin 124, which detent pin 124 is adapted to project into bore 104. Detent pin 124 is retained within the bore 123 by means of a removable plate 125. To assure positive alignment between the respective segments 72 and 73, the respective central sections may be connected in a mortise joint.

Latch means 79 (FIGS. 14 and 15) previously referred to, comprises a bore 126 in scroll plate 78 which bore 126 houses a spring biased detent pin 127. The end portion of detent pin 127 is adapted to register with a bore 128 (FIG. 14) in hub 76 to maintain the scroll plate 78 and the drum hub 76 in fixed relationship as shown in FIG. 14. Detent pin 127 has a cross pin 129 which extends transversely therethrough positioned within a recess 131 of hub 76. Upon upward movement of pin 127 from bore 128 and twisting such detent pin 127, the cross pin 129 maintains detent pin 127 out of bore 128 to allow relative movement between drum hub 76 and scroll plate 78. Upon rotation of scroll plate 78 relative to drum hub 76, the grooves 81 on scroll plate 78 cam the respective leg members 74 radially inwardly via their connection to the respective follower members 82 until the apexes 86 of the leg members 74 abuttingly engage each other. To maintain a fixed relationship between such drum hub 76 and the scroll plate 78, with the fixed segments in collapsed condition, drum hub 76 has a bore 132 (FIG. 15) which is adapted to register with the end portion of detent pin 127 upon twisting of such detent pin 127 to align the cross pin 129 with recess 131.

Figure 20:
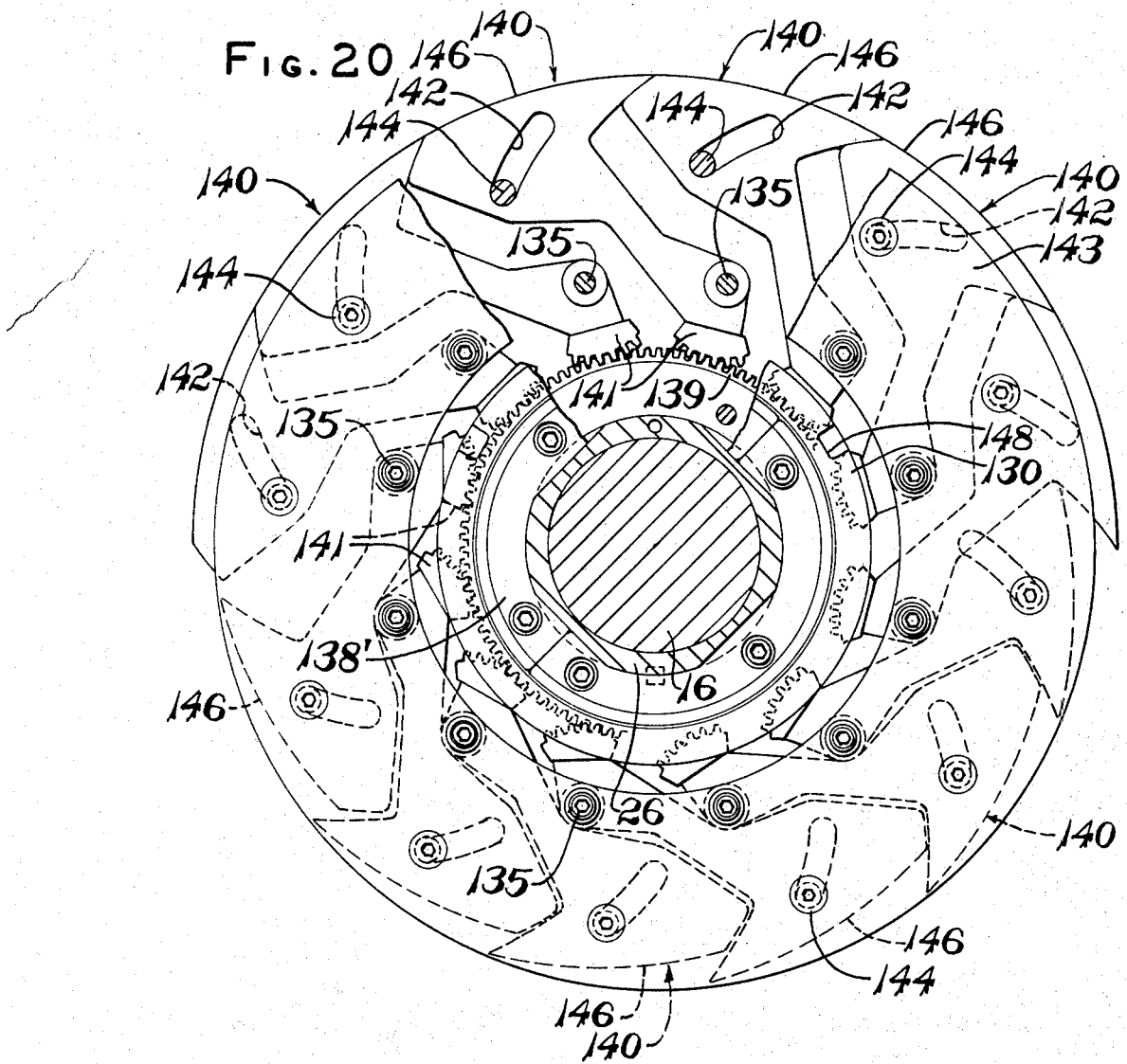
FIG. 20 is an end view of the bead ring flange with portions thereof broken away.

The bead ring flanges B and B' are identical in construction and only one bead ring flange will be described. Bead ring flange B (FIGS. 20 and 21) comprises a ring 133 that is suitably connected to an annular ring adapter 134. Ring adapter 134 is journalled for rotation on shaft 16. Ring 133 is recessed as at 135′, which recess 135′ cooperates with the outer circumferential edge 136 of the ring adapter 134 to define a groove therebetween which groove accommodates an inflatable sealing tube 137 (FIG. 9). Ring adapter 134 has a reduced hub portion 138 on which is mounted for relative rotation thereto an annular gear 139. Annular gear 139 is retained in position on hub 138 by an annular plate 138′. Annular gear 139 has an annular ring 130 welded thereto for rotation therewith, which rotation is selectively relative to the ring adapter 134 and hub 138. Ring 130 has an upwardly extending boss 130′ recessed as at 130″ to accommodate a spring biased detent 120 having a laterally extending projection 110. A plurality of circumferentially spaced gear segments 140 having toothed portions 141 meshing with the annular gear 139 are respectively pivotally mounted on the ring adapter 134 as at 135. Each gear segment 140 has a groove 142 in its upper end portion, which as viewed in FIG. 20 slopes generally downwardly toward the axis of rotation of shaft 16. A retaining ring 143 is spaced from ring adapter 134 and secured thereto by the pivot means 135 and screw 144. Screw 144 has a bushing 145 mounted thereon, which bushing 145 extends through the groove 142, maintains the spacing therebetween and operates to cam gear segment 140 outwardly or downwardly as gear segment 140 is rotated by annular gear 139, pivoting such gear segment 140 about pivot means 135. As seen in FIG. 20, the gear segments 140 in the upper portion of the drawings are shown in the extended position with the bushing 145 and screw 144 engaged by the portion of groove 142 such that the outer circumferential edge 146 of gear segment 140 extends beyond the retaining ring 133 whereas the gear segments 140 in the lower portion of FIG. 20 are shown in the contracted position with the bushing 145 and screw 144 engaged by the upper portion of groove 142. The two positions are shown for reasons of clarity and it is understood that all gear segments 140 are either in the contracted or extended position. The gear segments 140 in the expanded position limit the axial movement of the bead ring flanges B and B′ into the drum D for a purpose to be described. To maintain the gear segments 140 in their selected positions, a lug 147 is bolted to the retaining ring 143. Such lug 147 cooperates with the spring biased detent 120 to prevent relative movement between the annular gear 139 and the retaining ring 143, the ring adapter 134 and the ring 133 of bead ring flange B.

Figure 23:
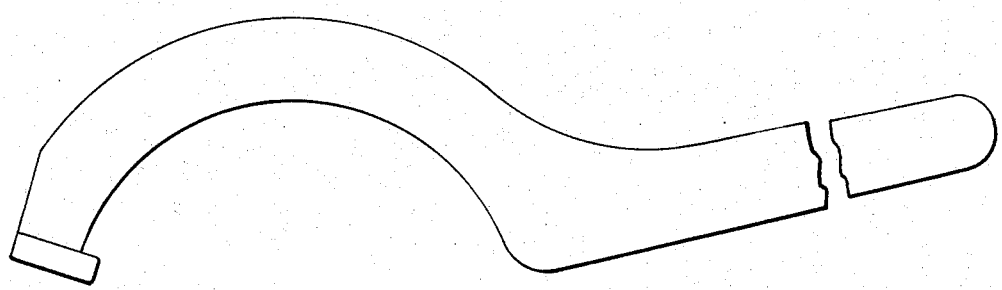
FIG. 23 is a side elevational view of a spanner wrench.
Figure 24:
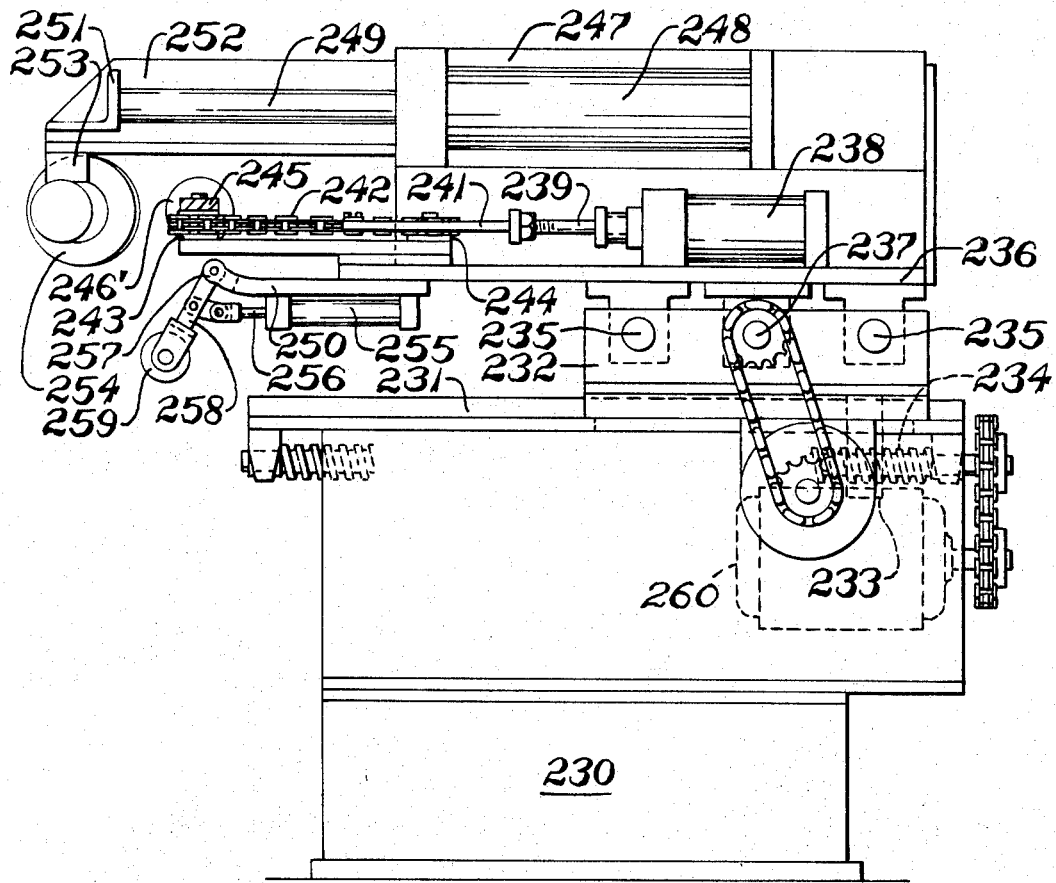
FIG. 24 is a side elevational view of the stitching mechanism C.

Ring 130 has a plurality of circumferentially spaced recesses 148 which cooperate with a spanner wrench shown in FIG. 23 which is used to depress the laterally extended projection 110 of detent 120 to permit relative rotation between the annular gear, the gear segments 140 and the ring adapter 134. Such action pivots the respective gear segments 140 about their pivot connection 135 such that bushing 145 and screw 144 reacting on groove 142 can cam the gear segments in the direction desired. By releasing the spring biased detent 120, the detent 120 abuttingly contacts the lug 147 as indicated by phantom lines in FIG. 22. Inflatable sealing tube 137 (FIG. 8) is provided with a supply of pressurized fluid from a suitable controlled source via a passageway 137′ extending through shaft 16 and ring adapter 134.

Turn-down turn-up means T and T′ are similar in construction and only one turn-down means will be described wherein like numerals refer to like elements throughout except that those relating to the turn-down turn-up means T′ are primed.

Turn-down turn-up means T comprises the cylindrical cage 49 attached to piston rods 48 for movement to and from the drum D. Cage 49 has a hub portion 149 which is slidably mounted on sleeve 26. Cage 49 supports a plurality of circumferentially spaced cams 151 (only one shown) on its inner wall surface. The taper of the cams 151 is inwardly towards the rear or base 152 of the cage 49 and outwardly towards the inner wall surface of the cage 49 as viewed in FIG. 8. The base 152 of cage 49 supports a plurality of hydraulic cylinders 153 (only one shown), which cylinders 153 have piston rods 154 extending interiorly into the cage 49. The axis of the piston rods 154 are generally parallel to the longitudinal center line of cylindrical cage 49. The respective end portions of rods 154 are connected to a sleeve 155, which sleeve 155 is slidably received on the hub portion 149. Sleeve 155 has a forwardly disposed portion 150 which encompasses and slidingly engages sleeve 26. Actuation of cylinder 153 whose rod end is connected to sleeve 155, causes relative linear movement between the sleeve 155 and the hub portion 149. The forwardly disposed portion 150 of sleeve 155 is adapted to abuttingly engage the end portion 160 of hub 149 and limit the linear movement of sleeve 155 towards the rear end of cage 49. Sleeve 155 has a radially outwardly extending annular flanged portion 156 which supports a plurality of circumferentially spaced lugs 157. A lever arm or turn-down arm 158 is pivotally mounted on its intermediate portion as at 159 on each lug member 157. The rearwardly disposed end of each lever arm 158 has a roller 161 rotatably mounted thereon and adapted to engage cam 151. The forwardly disposed end of each lever arm 158 has a rounded outer end portion 162 with an arcuate socket to receive a helical annular spring or stitching ring 163. The stitching ring 163 biases the rollers 161 into engagement with the cams 151. As viewed in FIG. 8, pressurization of the head end of cylinder 153 moves piston rod 154 and sleeve 155 leftwardly causing the rollers 161 (only one shown) to follow the contour of cam 151 to thereby enlarge the circumference of the stitching ring 163 as the forward end of lever arm 158 moves radially outwardly. Sleeve 155 has a roller 164 riding between guideways 165 attached to cage 49 to prevent rotation between the cage 49 and the sleeve 155 while permitting relative linear movement therebetween. Cage 49 as shown in FIGS. 8 and 1 has a roller 166 guided between a pair of longitudinally extending guideways 167 attached to the headstock H to prevent rotation of cage 49 while permitting its rectilinear movement. The forward portion of the sleeve 155 supports an annular ring 168 whose outer circumferential surface is threaded to threadedly receive an annular cam 169 having a contour surface 171. The threaded connection between cam 169 and ring 168 permits linear adjustment of cam 169 on annular ring 168. The forward portion of sleeve 26 (FIG. 8) is threaded as at 172 whereby a threaded annular split collar 173 is suitably adjustably secured thereon to act as a stop means for the linear movement of sleeve 155. Thus sleeve 155 is limited in its linear movement between collar 173 and end portion 160 of hub 149.

Slidably mounted on sleeve 155 is a sleeve 174, which sleeve 174 is threaded as at 175. As viewed in FIG. 8, the rightward end or rearward end of sleeve 174 has at least a pair of radially outwardly extending projections 176 to which are attached piston rods 177 of hydraulic cylinders 178 (only one shown). The hydraulic cylinders 178 are suitably rigidly secured to annular sleeve 155. Pressurization of hydraulic cylinders 178 provides relative linear movement between sleeves 174 and 155. The forward portion of sleeve 174 threadedly receives an annular support 181 which support 181 has a plurality of circumferentially spaced pivot means 182. A plurality of circumferentially spaced lever arms or turn-up arms 183 have one end pivotally connected to the pivot means 182 and the intermediate section rotatably supporting a roller 184 which roller 184 contacts the contour surface 171 for guided movement. The other end of each lever arm 183 has a rounded outer end portion 185 with an arcuate socket to receive a helical annular spring or stitching ring 186. The stitching ring 186 biases the rollers 184 and arms 183 towards the cam 169. The other end of each lever arm 183 additionally supports a bracket 187, which bracket 187 has a rounded outer end portion 188. The respective outer end portions 188 of the brackets 187 provides a circumferentially extending seat for a helical annular spring or stitching ring 189 which cooperates with the stitching ring 186 to perform a turn-up operation.

The forward portion of cage 49 supports an annular bead setter 190 (FIG. 8) which is suitably secured as rounded outer end portion 185 with an arcuate socket to recessed to accommodate a holding ring 191 which holding ring 191 cooperates with a forwardly projecting edge portion 192 on bead setter 190 to receive a bead for placement onto a tire carcass as shown in FIGS. 9 and 10.

The inner forward peripheral wall portion of cage 49 supports a plurality of circumferentially spaced hydraulic cylinders 193 which have piston rods 194 (only one shown in FIG. 8) projecting horizontally outwardly along axes that are parallel to the longitudinal center line of cylindrical cage 49. The piston rods 194 project outwardly through bores 195 in the forward portion of cage 49 and bores 195′ in bead setter 190. The forwardmost portion of piston rods 194 are connected to an annular holding ring 191. Pressurization of hydraulic cylinder 193 effects relative movement between the holding ring 191 and the bead setter 190 to complete the setting of the bead onto the tire carcass in a manner to be described.

The tire removal mechanism R (FIGS. 1, 5 and 12) comprises an annular support member 196 supported by a pair of spaced plates 197 which plates 197 are secured to movable beams 198 (only one shown). The end portions of beams 198 have pairs of rollers 199 secured thereto, with such pairs of rollers 199 engaging transversely extending I-beams 200 therebetween. The respective parallel I-beams 200 are supported by pairs of rollers 201 on a longitudinally extending I-beam 202 which beam 202 is secured to an overhead structure. Thus, with I-beams 202 and 200 extending at right angles to each other, there is provided sufficient mobility to the support member 196 to facilitate the removal of a tire carcass from the area of the tire building machine.

The lower portion of support member 196 has pairs of spaced bosses 203, with each boss having a bore 204 extending therethrough. Support member 196 has a boss 205 located intermediately of each pair of bosses 203, with each boss 205 having a threaded bore 206. Each threaded bore 206 has its central axis parallel the axes of the adjacent bores 204. Each bore 206 receives a threaded shaft 207 having a hand-wheel 208 attached to one end thereof for rotating such shaft 207. The other end of shaft 207 is secured to an arcuately shaped plate 209. Rotation of handwheel 208 operates to move plate 209 radially outwardly or inwardly for adjustment purposes to accommodate different size tires. The respective bores 204 slidably receive guide rods 211, which rods 211 are attached to the adjacent arcuately shaped plates 209 to maintain radially aligned movement of the plate 209 upon rotation of handwheel 208.

The upper portion of support member 196 has a pair of spaced support means similar to those just described in cooperation with adjustable clamp means 212 shown in FIGS. 5 and 12. Since the clamp means 212 are similar in all respects, only a single clamp means 212 will be described wherein like numerals refer to like elements throughout.

Clamp means 212 has an arcuately shaped plate 213 that is radially adjustable on support member 196. A threaded rod 214 received by a threaded bore 215 (FIG. 5) on support member 196 has one end secured to a handwheel 216 and the other end rotatably secured to the arcuately shaped plate 213. As in arcuately shaped plate 209, plate 213 is guided in its radial adjustment by a pair of spaced guide rods 217 (FIG. 12) attached thereto and which guide rods 217 are slidably received by a bore in the support member 196. Support member 196 has a pair of spaced lugs 218 laterally spaced from threaded bore 215. In addition, support member 196 has a pair of spaced dovetail grooves 219 which grooves 219 respectively slidably receive a guide block 21. Each guide block 221 is adjustable in the groove 219 by a threaded connection to a threaded rod 222. The rod 222 is rotatably mounted in lug 218 by a handwheel 223 attached to one end of such rod 222. Each guide block 221 has a hook 224 suitably connected thereto as by a spring for gripping the removable drum segments as to be described.

Stitching mechanism C comprises a base frame 230 having transversely extending ways 231 on which is mounted a carriage 232 for reciprocable movement. Carriage 232 has a depending threaded lug 233 which receives a threaded screw 234 driven by suitable means to thereby reciprocate carriage 232 on ways 231. Carriage 232 has a pair of longitudinally extending guide rods 235. Slidably mounted on such rods 235 is a pair of spaced cross slides 236 and 236′. Carriage 232 supports for rotation a lead screw 237 threadedly engaged by cross slides 236 and 236′. Cross slide 236 threadedly engages that portion of lead screw 237 that is of a right hand thread whereas cross slide 236′ threadedly engages that portion of lead screw 237 that is of a left-hand thread such that rotation of lead screw 237 moves the cross slides 236 and 236′ away or toward each other depending on the direction of rotation of such screw 237. Cross slide 236 and 236′ are of identical construction except that they are of opposite hand; accordingly, only cross slide 236 will be described with like reference numerals referring to similar elements throughout except that the numerals of cross slide 236′ will all be primed. A hydraulic cylinder 238 is mounted on cross slide 236 with its longitudinal axis extending perpendicularly to the longitudinal axis of drum D. Hydraulic cylinder 238 has a piston rod 239 to which is attached a bracket 241, which bracket 241 is suitably secured to a chain 242. A pair of spaced spur gears 243 and 244 are mounted for rotation on the forward portion of cross slide 236. Chain 242 encircles the respective gears 243 and 244 forming a continuous chain such that movement of piston rod 239 by pressurization of hydraulic cylinder 238 operated to rotate the respective gears 243 and 244. Gear 243 has one end of a pivotable arm 245 connected thereto, such that as gear 243 rotates, arm 245 will be swung in accordance to the rotation of gear 243. The other end of arm 245 rotatably supports a contoured stitching wheel 246. Cross slide 236 has an upwardly extending bracket 247 on which is mounted a hydraulic cylinder 248, whose axis is parallel to that of hydraulic cylinder 238. Cylinder 248 has a forwardly extending piston rod 249, which rod 249 has its forward end secured to a bracket 251. Bracket 251 has a laterally spaced rearwardly extending support 252 which rides in suitable guideways located on bracket 247. Bracket 251 has a downwardly extending brace 253 which rotatably supports a stitching wheel 254.

The underside of cross slide 236 has mounted on its forward portion a plate 250, to which plate 250 is secured a hydraulic cylinder 255 with a piston rod 256. Plate 250 supports a bifurcated member 257 on which is pivotally mounted one end of a lever arm 258. The intermediate portion of lever arm 258 is pivotally connected to the piston rod 256 whereby pressurization of hydraulic cylinder 255 operates to swing lever arm 258 about the pivotal connection to bifurcated member 257. The other end of lever arm 258 has a stitching roll 259 rotatably mounted thereon.

In operation of the tire building machine, it is assumed that the machine is in the position shown in FIG. 1, wherein the drum D is in expanded position with the beads set in position on the respective bead setters 190 (FIGS. 1 and 8) of the cages 49 and 49′. An elastomeric sheet having parallel cords with a marked center line is placed onto the drum D such as to properly center the band via its marked center line with the use of the light source L. Such band is made from cord fabric which may contain strands of wire such that the cords or wire are at right angles to the longitudinal edges of the band, such cord being referred to as radial cords. Headstock H' is moved inwardly toward the drum D by pressurization of hydraulic cylinder 36 until headstocks H and H' are equidistant from drum D. Here as in operations to follow, the description will be directed namely to headstock H although it is to be understood that like operations are performed by similar elements in headstock H'. The head end of hydraulic cylinders 153 on the rear of cage 49 (FIGS. 1 and 8) is pressurized to move sleeve 155 inwardly towards the drum D. Such action pivots the forward portion of lever arms 158 radially outwardly since the cams 151 operate to move the rollers 161 of lever arms 158 inwardly. Cams 151 remain stationary while rollers 161 move from right to left thereby camming the rollers 161 inwardly which imparts an outward movement to the forward portion of lever arms 158. Cage 49 is prepositioned by the pressurization of cylinder 42 in headstock H such as to move plate 38 leftwardly as viewed in FIG. 1 to thereby move cage 49 and the turn-down arms or lever arms 158 to the position shown in FIG. 8. With such action, the outer edge of the tire band designated A in FIG. 8 is turned inwardly or turned down by the simultaneous inward movement of the stitching ring 163 which is accomplished by pressurization of hydraulic cylinders 47 (FIG. 1) in headstock H which moves the cage 49 inwardly towards the drum D until end portion 160 of cage 49 engages forwardly disposed portion 150 on sleeve 155. Sleeve 155 is stationary since forwardly disposed portion 150 is abuttingly engaged with stop means of annular split collar 173 on sleeve 26. At the termination of such inward movement of cage 49, the bead is positioned onto the tire carcass. The hydraulic cylinder 193 is then pressurized to exert sufficient pressure on the holding ring 191 to assure a firm adherence of the bead to the tire carcass.

Thereafter the turn-up means or lever arms 183 (only one shown in FIG. 7) is prepositioned for the turn-up operation by the pressurization of hydraulic cylinder 42 (FIG. 1) in headstock H such as to move plate 38 rightward as viewed in FIG. 1. Such action of hydraulic cylinder 42 exerts a moving force on cylinder 42 through the reaction of piston rod 43 to stop means 45 to simultaneously move hydraulic cylinder 47 rightward along with piston rod 48, cage 49, sleeve 155 (FIG. 8), and sleeve 174. During such rearward movement of the cage 49 hydraulic cylinders 193 maintain a pressure on the bead positioned on the carcass or tire band located on the drum. Such action assures a positive pressure on the beads and eliminates the need for cementing down the edges of the tire band onto the drum edges as heretofore required to prevent wrinkling or displacement of the edges of the tire band for the turn-down and turn-up operations. Such action also assures the proper locating of the bead and permits an accurate turn-up operation without slippage of the bead or displacement thereof. The rod end of cylinder 193 is then pressurized while the head end of cylinder 193 is connected to exhaust to thereby move the holding ring 191 back into its abutting position with cage 49 and the bead setter 190.

Figure 18:
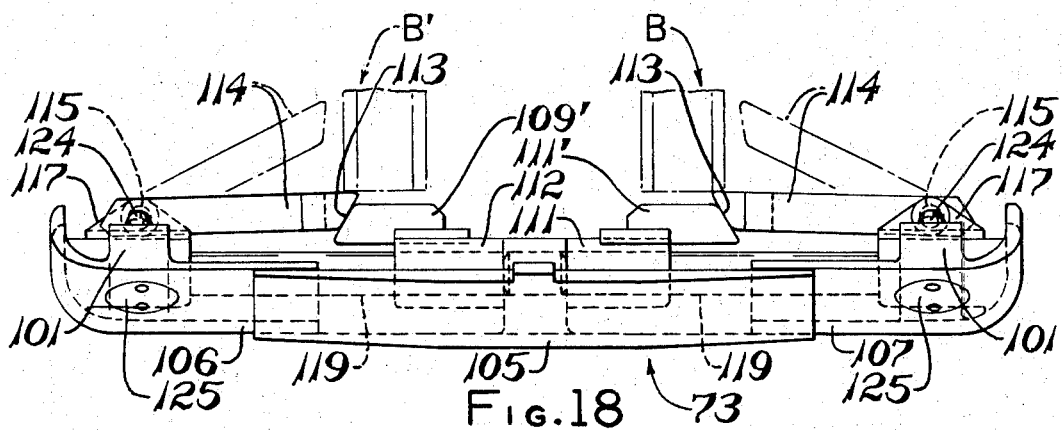
FIG. 18 is a side elevational view of the removable segment.

The turn-up operation on the tire band to encompass the bead is performed by pressurization of hydraulic cylinder 178 (FIG. 8) which action moves the piston rod 177 and sleeve 174 leftward as viewed in FIG. 8. Such action imparts an outward sweeping action to the stitching ring 186 since the camming of turn-up arm or lever arm 183 is effected by the linear movement of roller 184 on cam 169. During such turn-down and turn-up operation it will be noted that the bead ring flange B supports the drum D in its rotation by its bearing on the link member 114 of drum D as shown in FIG. 18.

Cage 49 is retracted from the drum D by pressurization of the rod end of hydraulic cylinder 47 while connecting the head end of cylinder 47 to exhaust whereby cage 49 is moved rightwardly as viewed in FIG. 1. Where desirable, strips of fabric may be applied and stitched to the overlapping of the plies of the turning-up operation by the pressurization of hydraulic cylinders 255.

A second band containing two plies of fabrics with cords parallel to each other, and with such cords at right angles to the longitudinal edges of the strip is put onto the drum over the first band by any conventional means such as a spear bar. Since such second band is marked previous to being applied to the tire carcass with a center line, its location onto the drum is assured with the aid of the projected line L' from light source L. Pressurization of the hydraulic cylinders 248 (only one shown in FIG. 20) advances the stitching wheels 254 until such wheels 254 engage the bands on the drum D. With such cylinders 248 pressurized to the degree desired to maintain a pressure on such bands, and with the drum D rotated through shaft 16, shaft 237 (FIG. 25) is rotated to move the respective cross slides 236 and 236' in opposite longitudinal directions to perform the stitching operation. The head end of hydraulic cylinder 248 is connected to exhaust while the rod end of cylinder 248 is pressurized to move the stitching wheels 254 away from the working area of drum D. The respective edges of the second band are turned down either with the turn-down or turn-up means as described above or through the operation of the stitching mechanism C. Lead screw 234 is rotated to move carriage 232 forwardly toward the drum D until the stitching wheels 246 and 246' are in position for the turn-down of the band edges.

Hydraulic cylinder 238 is then pressurized to advance the piston rod 249 forwardly, moving chain 242 in an orbit and thereby swinging arm 245 which is connected to gear 243. As arm 245 is swung, stitching wheel 246 is also swung into engagement with the band edge to perform the turning-in operation to adhere the second band edges to the formed first band edges. Hydraulic cylinder 238 retracts the stitching wheel 246 and thereafter lead screw 234 is rotatably driven by a motor 260 to retract the carriage 232 from the drum D. Stitching wheel 246' performs a similar operation through similar elements. A pair of sidewall strips are then placed onto the carcass being formed on the drum D, closely adjacent the respective side edges thereof. Such sidewall strips are then stitched through manipulation of the stricting rollers 254 and 254' as described above. If desired, bead cover strips may be applied (certain of the lapped edges prior to the application of the sidewall strips) to provide additional rubberized biased fabric to strengthen the tire carcass.

A spanner wrench similar to the one shown in FIG. 23 is used to depress the laterally extending projection 110 of detent pin 120. The spanner wrench is then rotated along with ring 130, and detent 120 relative to the stationary expander tube ring 133, ring adapter 134, hub 138 and retaining ring 143, which action cams out the respective gear segments 140 to erect an annular shoulder of the outer circumferential edges 146 of gear segments 140. Such shoulder limits the axial movement of the bead ring flange B into the drum D.

In order to move bead ring flange B axially, the cross head 27 (FIG. 7) must be fed axially since bead ring flange B and cross head 27 are connected to the common sleeve 26. Through suitable clutch means, sprocket 19 is driven to rotate gear 25 and gears 23 and 24, which gears 23 and 24 rotate the respective feed screws 21 and 22 to move crosshead 27 axially along with sleeve 26 (FIGS. 3 and 6). Since bead ring flange B is connected to sleeve 26, the bead ring flange B is also moved axially until the erected shoulder thereon abuttingly contacts the tire carcass on the drum D. The bead ring flange B' is similarly operated. As the respective cages 49 and 49' are brought in axially towards the drum the respective hydraulic cylinders 87 are connected to exhaust to permit axial collapsing of the drum D. Hydraulic cylinders 47 are pressurized to move the bead ring flange B axially inwardly such that the erected shoulder thereon through the outer circumferential edges 146 of gear segments 140 axially collapse the drum D, wherein the respective end arcuate sections 84 and 85 are moved inwardly toward the central arcuate sections 83 while pressurized air is introduced into the tire carcass chamber defined by the tire carcass and the bead ring flanges B and B'. Simultaneously with the inflating of the tire carcass, the band support shell S is positioned at the tire carcass such that an overhead band strip centered therein is located centrally over the tire carcass with the respective recesses 61 centered by the centering means L. As pressurized air is applied to the tire carcass chamber, the tire carcass is inflated and assumes a toroidal shape such that the central portion of the tire carcass firmly engages the overhead band. Hydraulic cylinder 66 is actuated to move yoke 69 and pulleys 71 downwardly to cam the pulleys 63 radially inwardly to thereby pivot the respective segments 59 outwardly away from the rubberized overhead band such as to permit the return of the support shell S to its original location away from the tire carcass being manufactured.

The overhead band is stitched to the tire carcass by stitching rolls 254 in the manner previously described above. A tread band is then applied centrally onto the tire by any conventional means, centered thereon through the aid of the centering means L, and then stitched by the stitching rolls 254 as explained above.

The tire removal means is then positioned over the formed tire carcass such that the plates 209 and 213 are adapted to contact and support the tire carcass (FIGS. 1 and 12). The air is exhausted from the tire carcass chamber followed by the retraction of the respective bead ring flanges B and B'. Hooks 224 (FIGS. 5 and 12) are then positioned to engage the uppermost pair of removable drum segments 73.

Drum D is collapsed by the rotation of scroll plate 78 relative to the hub 76 after latch means 79 has been operated to permit such relative rotation. As scroll plate 78 is rotated, cam grooves 81 cam the respective followers 82 inwardly to thereby move the fixed segments 72 along with leg members 74 radially inwardly on drum hub 76. Along with such movement, the fixed segments 72 are moved radially inwardly. The lowermost pair of removable segments 73 are left within the formed tire carcass since their weight permits their retention therein whereas the uppermost pair of removable segments are retained within the tire carcass by the hooks 224. The removable segments 73 are removed from the tire carcass and the completed formed tire carcass is then removed for vulcanization.

The described tire building machine is now ready to begin a new cycle of operation to build another tire carcass. Beads are positioned on the respective bead setters 194 and 194' along with the centering of an overhead band on the band support shell S. The respective fixed segments 72 are expanded radially by the relative rotation of the scroll plate 78 relative to the hub 76 to effect a camming out of the fixed segments 72 as described above. The drum D is then assembled by positioning the removable segments 73 relative to the fixed segments 72 such that the end portions of spring biased detent pins 124 project into the respective bores 104 to present a continuous smooth building surface. The drum D is then expanded axially preparatory to the building of the tire carcass by the pressurization of the respective hydraulic cylinders 87. The remaining portions of the tire building machine have been described above.

It should be understood, of course, that the foregoing disclosure relates only to a preferred embodiment of the invention and that numerous modifications or alternations may be made therein without departing from the spirit and the scope of the invention as set forth in the appended claims.

We claim:
1. Bead supports for a tire building apparatus comprising an annular ring 133 with a reduced hub portion 138, said ring having a circumferentially extending inflatable member adapted to abuttingly engage a tire carcass, an annular gear 139 mounted on said hub portion for rotation relative thereto, said ring having a plurality of circumferentially spaced arm members 140 pivotally mounted thereon, each member having a gear segment 141 meshing with said annular gear, cam means 142 mounted on said ring operatively engaging said members for pivoting said arm members upon rotation of said annular gear relative to said hub portion whereby the outer edges of said arm members are adapted to selectively define an annular flanged shoulder.

2. Bead supports for a tire building apparatus as set forth in claim 1 wherein said outer edges of said arm members define a continuous closed ring with said arm members in one pivoted position.

3. Bead supports for a tire building drum comprising an annular ring with a reduced hub portion, the outer edge of said ring having a circumferentially extending recess, an inflatable member located in said outer circumferentially extending recess, an annular gear mounted on said hub portion, said annular gear having spring biased means operatively engaging stop means on said annular ring to prevent relative rotation therebetween, said spring biased means operable in an unlatched condition to permit relative rotation between said annular gear and said annular ring, said ring having a plurality of circumferentially spaced segments pivotally mounted thereon, each segment having a gear sector operatively engaging said annular gear, each segment having an arcuately shaped slot extending in a radial direction from the outer edge thereof radially inwardly, a plurality of circumferentially spaced pins mounted on said ring, each of said slots having one of said pins projecting therein and operative on rotation of said annular gear relative to said hub portion for camming the outer circumferential edge of said segments radially outwardly.

4. In a tire building machine comprising a base frame, an axially collapsible tire building drum rotatably mounted on said frame, means for rotating said drum, a pair of oppositely disposed expansible discs in coaxial relationship to said drum with each disc having an annular flange upon expansion, means for moving said flanged discs axially toward and away from each other, said discs normally movable within said drum for supporting said drum for rotation, and said discs in the expanded condition having said annular flanges abuttingly contacting the side edge portions of said drum for collapsing said drum axially upon axial movement of said discs.

5. In a tire building machine comprising a base frame, a drum rotatably mounted on said frame, said drum having a central section and laterally spaced cylindrical portions movable axially toward and away from said central section, a pair of spaced expansible discs in coaxial relationship to said drum, means for moving said discs axially toward and away from each other, said discs movable axially into said drum for supporting said drum for rotation, each of said discs having an inflatable member cooperative with a radially expansible shoulder on said discs for engagement with the side portions of said drum to define a closed chamber therebetween and means for moving said discs with said shoulder in the radially expanded condition axially toward each other to simultaneously move said laterally spaced cylindrical portions toward each other.

6. In a tire building machine comprising a base frame, a rotatable drum supported by said frame, said drum having a rigid cylindrical surface with oppositely disposed side edge portions, means for rotating said drum, a pair of oppositely disposed cages mounted in coaxial relationship to said drum, said cage supporting a hub, each hub having an annular recess for receiving a bead, means on each of said cages for moving said hub associated therewith relative to said cage for positioning a bead onto a tire carcass being formed on said drum, means for moving said cages axially toward each other, each cage having a turn-up and turn-down means cooperative with cam means in said cages for providing a turn-down of plies on said drum prior to setting of a bead onto such turned-down plies by said hub and providing a turn-up of plies on said drum about such bead, each of said cages having an expansible flange movable therewith, each of said flanges movable into said drum for supporting said drum during turn-down and turn-up operations and operative in an expanded condition to engage the side edge portions of said drum to provide an air chamber defined by said flanges and the tire carcass being formed on said drum.

7. In a tire building machine comprising a base frame, a rotatable drum supported by said frame, means for rotating said drum, said drum being axially collapsible, ply turn-up and turn-down means mounted in coaxial relationship to said drum, means for moving said ply turn-up and turn-down means axially toward each other, said means having bead setters movable therewith, means for moving axially said bead setters relative to said turn-up and turn-down means for placing a bead onto the respective side edge portions of said drum, means operatively connected to said ply turn-up and turn-down means for effecting a ply turn-down on plies on said drum prior to such bead setting and for effecting a ply turn-up on plies on said drum after such bead setting, each ply turn-up and turn-down means having a disc movable therewith to support said drum during such turn-up and turn-down, and each of said discs being expansible to contact the respective side edge portions to effect an axial collapsing of said drum by axial movement of said ply turn-up and turn-down means.

8. In a tire building machine comprising a base frame having an axially collapsible building drum supported at the end of a cantilever shaft, means operatively connected to said shaft for rotating said drum, said drum having laterally spaced side edge portions, said shaft having a passageway therethrough connectable with the interior of said drum, said drum having openings communicating the interior of the drum radially outwardly of said drum, means located at each end of the drum coaxially therewith, said means including stitching means adapted to turn the tire plies extending beyond the ends of said drum around the beads positioned at the respective lateral side portions of said drum, said means having bead setting means operative upon actuation for movement relative to said first mentioned means to set the beads onto the tire carcass against said side portions of said drum after the tire plies extending beyond the side edges of said drum have been turned radially inwardly by said stitching means, bead ring flanges located on said means and movable therewith, said flanges movable into said drum, said flanges being expansible to provide a shoulder for abutting engagement with said side edge portions to define an air chamber with said drum, and other means operative to pressurize said chamber simultaneously with axial movement of said first mentioned means toward each other to collapse said drum axially to shape a tire carcass on said drum into a toroidal shape.

9. In a tire building machine as set forth in claim 8 wherein said frame supports a shell having a diameter greater than said drum, said shell movable coaxially over said drum and circumferentially encompassing said drum for positioning an inextensible overhead rubbery fabric onto such drum.

10. In a tire building machine as set forth in claim 9 wherein centering means mounted closely adjacent said drum provides a line image on said drum with said line image contained in a plane normal to the axis of rotation of said drum.

11. In a tire building machine as set forth in claim 10 wherein said frame supports a shell having a diameter greater than said drum and an axis of rotation coaxial with the axis of rotation of said drum, said shell movable into circumferentially encompassing relationship with said drum for positioning an inextensible overhead rubberized material onto the tire carcass located on said drum and said shell having circumferentially spaced centering means lying in a plane normal to the axis of rotation of said shell and said drum to align said shell with the line image from said centering means.

12. A tire building machine comprising a drum mounted on a shaft for rotation therewith, a cage supported for axial movement adjacent one end of said drum externally thereof, a pair of sleeves mounted in said cage coaxially therewith and movable relative thereto, means operatively connected to each of said sleeves for moving said sleeve axially relative to each other and to said cage, one of said sleeves pivotally supporting a plurality of axially extending arms, a first annularly shaped expansible and rollable member supported by said arms in coaxial relationship to said drum, cam means on said cage cooperative with said arms in the axial movement of said one sleeve to cause a predetermined radial movement to said rollable member to effect a turn-down and smoothing of the edge of ply stock extending axially over the side edges of said drum, the other of said sleeves pivotally supporting a plurality of axially extending levers, a second annularly shaped expansible and rollable member supported by said levers in coaxial relationship to said drum, cam means on said one sleeve cooperative with said levers in the axial movement of said other sleeve relative to said one sleeve to cause a predetermined radial movement to said rollable members carried by said levers to effect a turn-up and smoothing of the edge of ply stock extending radially inwardly over the side edges of said drum.

13. A tire building machine as set forth in claim 12 wherein each of said cam means is axially adjustable.

14. A tire building machine as set forth in claim 13 wherein said one sleeve has a pair of spaced shoulders operative to selectively abut spaced stops on said shaft to thereby limit the axial movement of said one sleeve.

15. A tire building machine as set forth in claim 12 wherein said cage supports an annular ring having an annular recess to accommodate a bead, and said cage having a plurality of spaced cylinders operatively connected to said ring to move said ring axially relative to said cage to position an annular bead onto a side edge portion of said drum.

16. A tire building machine comprising a base frame supporting a tire building axially collapsible drum, said tire building drum having a tire building surface and side edge portions, a pair of spaced cylindrical housings supported by said frame for axial movement adjacent each side edge portion of said drum externally thereof, each housing supporting a first and second sleeve movable therewith and relative thereto, each housing supporting an annular ring for accommodating a bead, each of said housings having a plurality of cylinders mounted thereon operatively connected to said rings associated therewith to provide axial movement to said ring to position an annular bead on said side edge portion adjacent thereto, each housing having cam means thereon, each first sleeve supporting turn-down means in coaxial relationship to said drum, cam means on each of said housings cooperative with said turn-down means in the axial movement of said first sleeves to effect a radial movement of said turn-down means whereby ply-stock extending axially of said drum is adapted to be turned radially inwardly, each second sleeve supporting turn-up means in coaxial relationship to said drum, cam means on each of said first sleeves cooperative with said turn-up means in the axial movement of said second sleeve to effect a radial movement of said turn-up means whereby ply-stock extending radially inwardly on said drum is adapted to be turned radially outwardly, and said turn-up means and said turn-down means being axially nested within said housing such that their outer edge portions are radially inwardly of said ring to thereby permit axial movement of said ring.

17. A tire building machine as set forth in claim 16 wherein each housing rotatably supports a flanged disc coaxial with said drum, each disc having a diameter less than said side edge portions whereby said discs are movable axially inwardly into said drum, and each disc having an expansible flange means operative upon expansion to abuttingly engage said side edge portion for collapsing said drum axially upon predetermined axial movement of said expanded discs.

18. A tire building machine as set forth in claim 17 wherein each of said discs has an annular inflatable member operative upon inflation to abuttingly engage the inner edge portion of said side portions of said drum to define a closed chamber with said drum.

19. A tire building machine comprising a base frame, a drum rotatably mounted on said frame for receiving plies to form a tire carcass, ply-turning means on adjacent end portions of said drum supported for axial movement adjacent each side edge portion of said drum, bead setting means mounted on said ply-turning means for movement therewith and relative thereto to effect a positioning of bead rings onto said side portions of said drum, a pair of expansible discs in coaxial relationship to said drum, one of each discs being mounted for movement with each of said ply-turning means, each of said discs having a diameter less than said edge portions whereby said discs are movable axially inwardly into said drum, each disc having an expansible flange means operative upon expansion to abuttingly engage said side edge portion for collapsing said drum axially upon predetermined axial movement of said expanded discs, each disc having an annular inflatable member operative upon inflation to abuttingly engage the inner edge portion of said side portions of said drum to define a chamber with said drum, and means operatively connected to said chamber for simultaneously pressurizing said chamber upon axial inward movement of said discs toward each other whereby a tire carcass on said drum is adapted to assume a toroidal shape.

20. A tire building drum as set forth in claim 19 wherein a shell is movable coaxially with said drum to circumferentially encompass said drum whereby an overhead band therein is adapted to limit the inflation of such tire carcass.

21. A tire building drum as set forth in claim 20 wherein an annular tire support is movably mounted adjacent said drum for movement into coaxial alignment with said drum upon displacement of said shell to encompass said drum and tire carcass thereon for removal of such tire carcass therefrom.

22. A tire building drum as set forth in claim 21 wherein said tire support has a plurality of circumferentially spaced arcuate supports adjustable radially thereon to accommodate different size tire carcasses.

23. A tire building drum as set forth in claim 22 wherein said tire support has a plurality of circumferentially spaced clamps for clamping engagement with certain portions of said drum.

24. A tire building drum as set forth in claim 23 wherein centering means mounted closely adjacent said drum provides a projected line image on said drum, and said shell having spaced centering means lying in a plane normal to the axis of rotation of said shell and said drum for alignment with said projected line image.

25. A stitching mechanism comprising a support member, a carriage mounted on said support member for movement in a first rectilinear direction, a cross slide mounted on said carriage for rectilinear movement in a second direction transverse to said first rectilinear direction, said cross slide having a first cylinder operatively connected to a swingable arm for moving said arm about a pivot means, a first stitching wheel rotatably mounted on said arm for stitching a curved surface on a drum having rubberized plies thereon, said cross slide having a second cylinder operatively connected to a second rotatable stitching wheel rotatable about an axis which is parallel to said second rectilinear direction, said second stitching wheel having a narrow circular stitching surface that lies in a plane normal to said second rectilinear direction, and said cross slide having a third cylinder operatively connected to a third stitching wheel rotatable about an axis parallel to said second rectilinear direction, and said third stitching wheel having a cylindrical stitching surface.

26. A stitching mechanism comprising a support frame member, a carriage mounted on said frame member for movement thereon in a first rectilinear direction, a pair of cross slides mounted on said carriage for movement thereon in a second rectilinear direction which second direction is transverse to said first direction, means operatively connected to said pair of cross slides for moving said slides selectively away or toward each other along said second direction, a pair of spaced gears mounted on each slide, a chain connected to each pair of said gears for orbiting movement therearound, a first cylinder mounted on each slide having a piston rod connected to the chain associated with said slide whereby pressurization of said first cylinders operate to rotate said gears associated therewith, one of each pair of gears having an arm rotatable therewith, each arm having a first stitching wheel with an arcuately shaped stitching surface rotatably mounted thereon for stitching carved surfaces, a second cylinder mounted on each slide having a piston rod connected thereto with a second stitching wheel rotatably mounted thereon, each of said second stitching wheels having a narrow circular stitching surface that lies in a plane normal to said second rectilinear direction, a third cylinder mounted on each slide having a piston rod connected to a swingable member, and each member rotatably supporting a stitching roll having a cylindrical surface.

27. In a tire building machine having a base frame, a drum rotatably mounted on said frame, centering means mounted closely adjacent to said drum, and said centering means comprising a light source projecting a line image on the surface of said drum or on the surface of material deposited on said drum whereby the conventionally longitudinally center marked tire tread can be centered onto said drum or tire carcass on said drum with the aid of said line image.

References Cited

UNITED STATES PATENTS

| | | | |
|---|---|---|---|
| 2,409,974 | 10/1946 | Breth et al. | 156—132 |
| 2,517,889 | 7/1950 | Kuffler | 156—126 |
| 2,609,311 | 9/1952 | Engler | 156—132 |
| 2,935,117 | 5/1960 | Pfeffer | 156—415 |
| 3,051,220 | 8/1962 | Ewing et al. | 156—128 X |
| 3,070,478 | 12/1962 | Riddle | 156—416 X |
| 3,178,327 | 4/1965 | Beckadolph et al. | 156—400 X |
| 3,178,331 | 4/1965 | Bishop et al. | 156—415 |
| 3,188,260 | 6/1965 | Nebout | 156—416 |

FOREIGN PATENTS

| | | |
|---|---|---|
| 882,327 | 11/1961 | Great Britain. |
| 232,727 | 5/1959 | Australia. |
| 251,397 | 7/1961 | Australia. |
| 1,132,033 | 10/1956 | France. |
| 856,513 | 11/1952 | Germany. |

EARL M. BERGERT, *Primary Examiner.*

CLIFTON B. COSBY, *Assistant Examiner.*

UNITED STATES PATENT OFFICE
CERTIFICATE OF CORRECTION

Patent No. 3,374,138                                                  March 19, 1968

Donald K. Porter et al.

It is hereby certified that error appears in the above numbered patent requiring correction and that the said Letters Patent should read as corrected below.

Column 1, line 31, for "and", first occurrence, read -- the --; column 5, line 18, after "cresent" insert -- shaped --; column 7, line 34, after "by the" insert -- lower --; line 39, for "anu" read -- and --; line 51, "Ring", should not appear as the beginning of a new paragraph; column 9, line 9, after "as" insert -- by cap screw 190' to the cage 49. Bead setter 190 is --; line 10, strike out "rounded outer end portion 185 with an arcuate socket to"; column 17, line 31, after "said", second occurrence, insert -- side --.

Signed and sealed this 22nd day of July 1969.

(SEAL)
Attest:

EDWARD M. FLETCHER, JR.                              WILLIAM E. SCHUYLER, JR.
Attesting Officer                                             Commissioner of Patents